US010694109B2

(12) United States Patent
Shingu et al.

(10) Patent No.: US 10,694,109 B2
(45) Date of Patent: Jun. 23, 2020

(54) IMAGING APPARATUS

(71) Applicant: Panasonic Intellectual Property Management Co., Ltd., Osaka (JP)

(72) Inventors: Yasuhiro Shingu, Osaka (JP); Michio Kishiba, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 68 days.

(21) Appl. No.: 16/235,367

(22) Filed: Dec. 28, 2018

(65) Prior Publication Data

US 2019/0230287 A1      Jul. 25, 2019

(30) Foreign Application Priority Data

Jan. 19, 2018   (JP) ................. 2018-007563

(51) Int. Cl.
*H04N 5/225*      (2006.01)
*H04N 5/232*      (2006.01)
*H04N 5/235*      (2006.01)

(52) U.S. Cl.
CPC ....... *H04N 5/23287* (2013.01); *H04N 5/2254* (2013.01); *H04N 5/235* (2013.01); *H04N 5/23258* (2013.01); *H04N 5/22525* (2018.08)

(58) Field of Classification Search
USPC ................................ 348/251, 252
See application file for complete search history.

(56) References Cited

U.S. PATENT DOCUMENTS

| 2006/0055788 A1* | 3/2006 | Kawabe | ............. H04N 5/23245 |
| | | | 348/208.12 |
| 2007/0071424 A1* | 3/2007 | Poon | .................... H04N 5/2351 |
| | | | 396/52 |
| 2007/0212045 A1* | 9/2007 | Yamasaki | .............. G03B 17/00 |
| | | | 396/55 |

(Continued)

FOREIGN PATENT DOCUMENTS

| JP | 2001-027772 A | 1/2001 |
| JP | 2006-259568 A | 9/2006 |
| JP | 2011-135537 A | 7/2011 |

*Primary Examiner* — Twyler L Haskins
*Assistant Examiner* — Dwight Alex C Tejano
(74) *Attorney, Agent, or Firm* — Renner, Otto, Boisselle & Sklar, LLP

(57) ABSTRACT

An imaging apparatus includes: a shake detector that detects a shake amount of at least one of an interchangeable lens and a camera body; an image stabilization unit that performs an image stabilization by moving at least one of a correction lens and an imaging device by an image stabilization amount obtained based on the shake amount; a storage unit that stores drive limit range information that indicates a relationship between an aperture value and a drive limit range corresponding to the interchangeable lens; and a controller. The drive limit range includes a range where the at least one of the correction lens and the imaging device is to be moved by the controller, and in the drive limit range, a light attenuation rate is less than or equal to a predetermined value. The controller sets the aperture value based on the drive limit range information and causes the image stabilization unit to perform the image stabilization, when a shooting mode is not a first mode that allows designation of the aperture value.

12 Claims, 14 Drawing Sheets

(56) References Cited

U.S. PATENT DOCUMENTS

| | | | | |
|---|---|---|---|---|
| 2008/0111903 A1* | 5/2008 | Makino | ............. | H04N 5/23232 |
| | | | | 348/302 |
| 2008/0267608 A1* | 10/2008 | Kubota | ................. | H04N 5/232 |
| | | | | 396/374 |
| 2015/0215515 A1* | 7/2015 | Isono | .................... | G03B 13/36 |
| | | | | 348/231.6 |
| 2016/0112618 A1* | 4/2016 | Sugaya | ............. | H04N 5/23258 |
| | | | | 348/208.5 |
| 2017/0353665 A1* | 12/2017 | Sato | .................... | H04N 5/2327 |
| 2018/0063413 A1* | 3/2018 | Yoshino | ................ | G03B 17/46 |

* cited by examiner

FIG. 7

(A) FOCUS POSITION 1 (FOCAL LENGTH) = ∞ 145

| | Zoom1 (Wide) | Zoom2 | Zoom3 | Zoom4 | Zoom5 | Zoom6 | Zoom7 | Zoom8 | Zoom9 (Tele) |
|---|---|---|---|---|---|---|---|---|---|
| AV1 | φ21.48 | φ21.54 | φ21.87 | φ21.91 | φ21.92 | φ22.02 | φ21.23 | φ21.22 | φ21.14 |
| AV2 | φ21.63 | φ21.69 | φ22.02 | φ22.06 | φ22.07 | φ22.17 | φ21.38 | φ21.37 | φ21.29 |
| AV3 | φ21.78 | φ21.84 | φ22.17 | φ22.21 | φ22.22 | φ22.32 | φ21.53 | φ21.52 | φ21.44 |
| AV4 | φ21.93 | φ21.99 | φ22.32 | φ22.36 | φ22.37 | φ22.47 | φ21.68 | φ21.67 | φ21.59 |
| AV5 | φ22.08 | φ22.14 | φ22.47 | φ22.51 | φ22.52 | φ22.62 | φ21.83 | φ21.82 | φ21.74 |
| AV6 | φ22.18 | φ22.24 | φ22.57 | φ22.61 | φ22.62 | φ22.72 | φ21.93 | φ21.92 | φ21.84 |
| AV7 | φ22.23 | φ22.29 | φ22.62 | φ22.66 | φ22.67 | φ22.77 | φ21.98 | φ21.97 | φ21.89 |
| AV8 | φ22.24 | φ22.3 | φ22.63 | φ22.67 | φ22.68 | φ22.78 | φ21.99 | φ21.98 | φ21.90 |

(B) FOCUS POSITION 2 (FOCAL LENGTH) = 1 m 145

| | Zoom1 (Wide) | Zoom2 | Zoom3 | Zoom4 | Zoom5 | Zoom6 | Zoom7 | Zoom8 | Zoom9 (Tele) |
|---|---|---|---|---|---|---|---|---|---|
| AV1 | φ21.51 | φ21.57 | φ21.90 | φ21.94 | φ21.95 | φ22.05 | φ21.26 | φ21.25 | φ21.17 |
| AV2 | φ21.66 | φ21.72 | φ22.05 | φ22.09 | φ22.10 | φ22.20 | φ21.41 | φ21.40 | φ21.32 |
| AV3 | φ21.81 | φ21.87 | φ22.20 | φ22.24 | φ22.25 | φ22.35 | φ21.56 | φ21.55 | φ21.47 |
| AV4 | φ21.96 | φ22.02 | φ22.35 | φ22.39 | φ22.40 | φ22.50 | φ21.71 | φ21.70 | φ21.62 |
| AV5 | φ22.11 | φ22.17 | φ22.50 | φ22.54 | φ22.55 | φ22.65 | φ21.86 | φ21.85 | φ21.77 |
| AV6 | φ22.21 | φ22.27 | φ22.60 | φ22.64 | φ22.65 | φ22.75 | φ21.96 | φ21.95 | φ21.87 |
| AV7 | φ22.26 | φ22.32 | φ22.65 | φ22.69 | φ22.70 | φ22.80 | φ22.01 | φ22.00 | φ21.92 |
| AV8 | φ22.27 | φ22.33 | φ22.66 | φ22.70 | φ22.71 | φ22.81 | φ22.02 | φ22.01 | φ21.93 |

FIG. 14

(A) FOCUS POSITION 1 (FOCAL LENGTH) = ∞

| | Zoom1 (Wide) | Zoom2 | Zoom3 | Zoom4 | Zoom5 | Zoom6 | Zoom7 | Zoom8 | Zoom9 (Tele) |
|---|---|---|---|---|---|---|---|---|---|
| AV1 | φ21.48 | φ21.54 | φ21.87 | φ21.91 | φ21.92 | φ22.02 | φ21.23 | φ21.22 | φ21.14 |
| AV2 | φ21.63 | φ21.69 | φ22.02 | φ22.06 | φ22.07 | φ22.17 | φ21.38 | φ21.37 | φ21.29 |
| AV3 | φ21.78 | φ21.84 | φ22.17 | φ22.21 | φ22.22 | φ22.32 | φ21.53 | φ21.52 | φ21.44 |
| AV4 | φ21.93 | φ21.99 | φ22.32 | φ22.36 | φ22.37 | φ22.47 | φ21.68 | φ21.67 | φ21.59 |
| AV5 | φ22.08 | φ22.14 | φ22.47 | φ22.51 | φ22.52 | φ22.62 | φ21.83 | φ21.82 | φ21.74 |
| AV6 | φ22.18 | φ22.24 | φ22.57 | φ22.61 | φ22.62 | φ22.72 | φ21.93 | φ21.92 | φ21.84 |
| AV7 | φ22.23 | φ22.29 | φ22.62 | φ22.66 | φ22.67 | φ22.77 | φ21.98 | φ21.97 | φ21.89 |
| AV8 | φ22.24 | φ22.3 | φ22.63 | φ22.67 | φ22.68 | φ22.78 | φ21.99 | φ21.98 | φ21.90 |

(B) FOCUS POSITION 2 (FOCAL LENGTH) = 1 m

| | Zoom1 (Wide) | Zoom2 | Zoom3 | Zoom4 | Zoom5 | Zoom6 | Zoom7 | Zoom8 | Zoom9 (Tele) |
|---|---|---|---|---|---|---|---|---|---|
| AV1 | φ21.51 | φ21.57 | φ21.90 | φ21.94 | φ21.95 | φ22.05 | φ21.26 | φ21.25 | φ21.17 |
| AV2 | φ21.66 | φ21.72 | φ22.05 | φ22.09 | φ22.10 | φ22.20 | φ21.41 | φ21.40 | φ21.32 |
| AV3 | φ21.81 | φ21.87 | φ22.20 | φ22.24 | φ22.25 | φ22.35 | φ21.56 | φ21.55 | φ21.47 |
| AV4 | φ21.96 | φ22.02 | φ22.35 | φ22.39 | φ22.40 | φ22.50 | φ21.71 | φ21.70 | φ21.62 |
| AV5 | φ22.11 | φ22.17 | φ22.50 | φ22.54 | φ22.55 | φ22.65 | φ21.86 | φ21.85 | φ21.77 |
| AV6 | φ22.21 | φ22.27 | φ22.60 | φ22.64 | φ22.65 | φ22.75 | φ21.96 | φ21.95 | φ21.87 |
| AV7 | φ22.26 | φ22.32 | φ22.65 | φ22.69 | φ22.70 | φ22.80 | φ22.01 | φ22.00 | φ21.92 |
| AV8 | φ22.27 | φ22.33 | φ22.66 | φ22.70 | φ22.71 | φ22.81 | φ22.02 | φ22.01 | φ21.93 |

IMAGING APPARATUS

BACKGROUND

1. Technical Field

The present disclosure relates to an imaging apparatus having an image stabilization function.

2. Description of the Related Art

It has been known that, when an image is formed on an image sensor through an optical system, such a phenomenon occurs in which intensity of light is decreased at edges of an image due to vignetting (in other words, light falloff at edges). PTL 1 discloses an optical device that reduces a variation in brightness at edges of an image caused by such light falloff at edges, when electronic image stabilization is performed.

Specifically, Unexamined Japanese Patent Publication No. 2001-27772 discloses an optical device that forms a subject image on an imaging device with an optical system having a zooming function and that performs an image stabilization by changing a crop position of the subject image on the imaging device. In this optical device, an aperture diameter for controlling an amount of light flux passing through the optical system is limited according to the focal length of the optical system. As described above, in PTL 1, the aperture diameter is limited according to the focal length of the optical system. Thus, the optical device reduces a variation in brightness at edges of a screen (particularly, a difference in brightness between the center of the screen and the edges of the screen near a telephoto end at which the variation in screen brightness is noticeable, due to the image stabilization) which occurs in association with an image stabilization, and therefore, generates a clear high-quality image.

SUMMARY

The present disclosure provides an imaging apparatus that reduces degradation in image quality caused by light falloff at edges of an image due to an image stabilization.

A first aspect of the present disclosure provides an imaging apparatus including a camera body to which an interchangeable lens including a correction lens and an aperture is mountable. The imaging apparatus includes: an imaging device that generates image data based on an image formed through the interchangeable lens; a setting unit that receives setting of a shooting mode; a shake detector that detects a shake amount of at least one of the interchangeable lens and the camera body; an image stabilization unit that performs an image stabilization by moving at least one of the correction lens and the imaging device by an image stabilization amount obtained based on the shake amount; a storage unit that stores drive limit range information that indicates a relationship between an aperture value and a drive limit range corresponding to the interchangeable lens; and a controller that controls the aperture and the image stabilization unit. The drive limit range includes a range where the at least one of the correction lens and the imaging device is to be moved by the controller, the drive limit range indicating a range where a light attenuation rate is less than or equal to a predetermined value. The controller sets the aperture value based on the drive limit range information and causes the image stabilization unit to perform the image stabilization, when the shooting mode set via the setting unit is not a first mode that allows designation of the aperture value.

A second aspect of the present disclosure provides an imaging apparatus having an image stabilization function. The imaging apparatus includes: an optical system including a correction lens; an imaging device that generates image data based on an image formed through the optical system; an aperture that adjusts an amount of light entering the imaging device through the optical system; a setting unit that receives setting of a shooting mode; a shake detector that detects a shake amount of at least one of the optical system and the imaging apparatus; an image stabilization unit that performs an image stabilization by moving at least one of the correction lens and the imaging device by an image stabilization amount obtained based on the shake amount; a storage unit that stores drive limit range information that indicates a relationship between an aperture value and a drive limit range corresponding to the optical system; and a controller that controls the aperture and the image stabilization unit. The drive limit range includes a range where the at least one of the correction lens and the imaging device is to be moved by the controller, the drive limit range indicating a range where a light attenuation rate is less than or equal to a predetermined value. The controller sets the aperture value based on the drive limit range information and causes the image stabilization unit to perform the image stabilization, when the shooting mode set via the setting unit is not a first mode that allows designation of the aperture value.

According to the present disclosure, light falloff at edges of an image caused by the image stabilization operation can be reduced. Thus, according to the present disclosure, an imaging apparatus capable of capturing a high-quality image can be provided.

BRIEF DESCRIPTION OF THE DRAWINGS

FIG. 7 is a diagram showing an example of a data structure of a drive limit range table;

FIG. 14 is a diagram for describing an example of AVs when the aperture value is controlled to be fixed.

DETAILED DESCRIPTION

Exemplary embodiments of the present disclosure will be described below with reference to the drawings. Note, however, that unnecessary parts in the description regarding prior arts and substantially identical configurations may be omitted in the detailed description. This is to simplify the description. The accompanying drawings and the following description are provided to help those skilled in the art to fully understand the present disclosure and are not intended to limit the subject matter recited in the appended claims. In the following description, a digital camera is used as an example of the imaging apparatus.

(First Exemplary Embodiment)

In a digital camera according to the present exemplary embodiment, an interchangeable lens and a camera body both have an image stabilization function for reducing an influence of shake of the camera on a captured image. Specifically, in the interchangeable lens, a lens for correcting shake is moved in a plane perpendicular to an optical axis of an optical system according to shake in a high-frequency region from among shake detected by a shake detector such as a gyro sensor. With this configuration, the influence of the shake can be reduced. Meanwhile, in the camera body, an image sensor such as a charge coupled device (CCD) is moved in the plane perpendicular to the optical axis of the optical system according to shake in a low-frequency region from among shake detected by the shake detector. With this configuration, the influence of the shake can be reduced. Now, the configuration and operation of the camera according to the present exemplary embodiment will be described in detail. In the following description, a function for correcting shake by moving a correction lens in the interchangeable lens is referred to as an "optical image stabilizer (OIS) function". A function for correcting shake by moving an imaging device in the camera body is referred to as a "body image stabilizer (BIS) function".

1. Configuration

Figure 1:
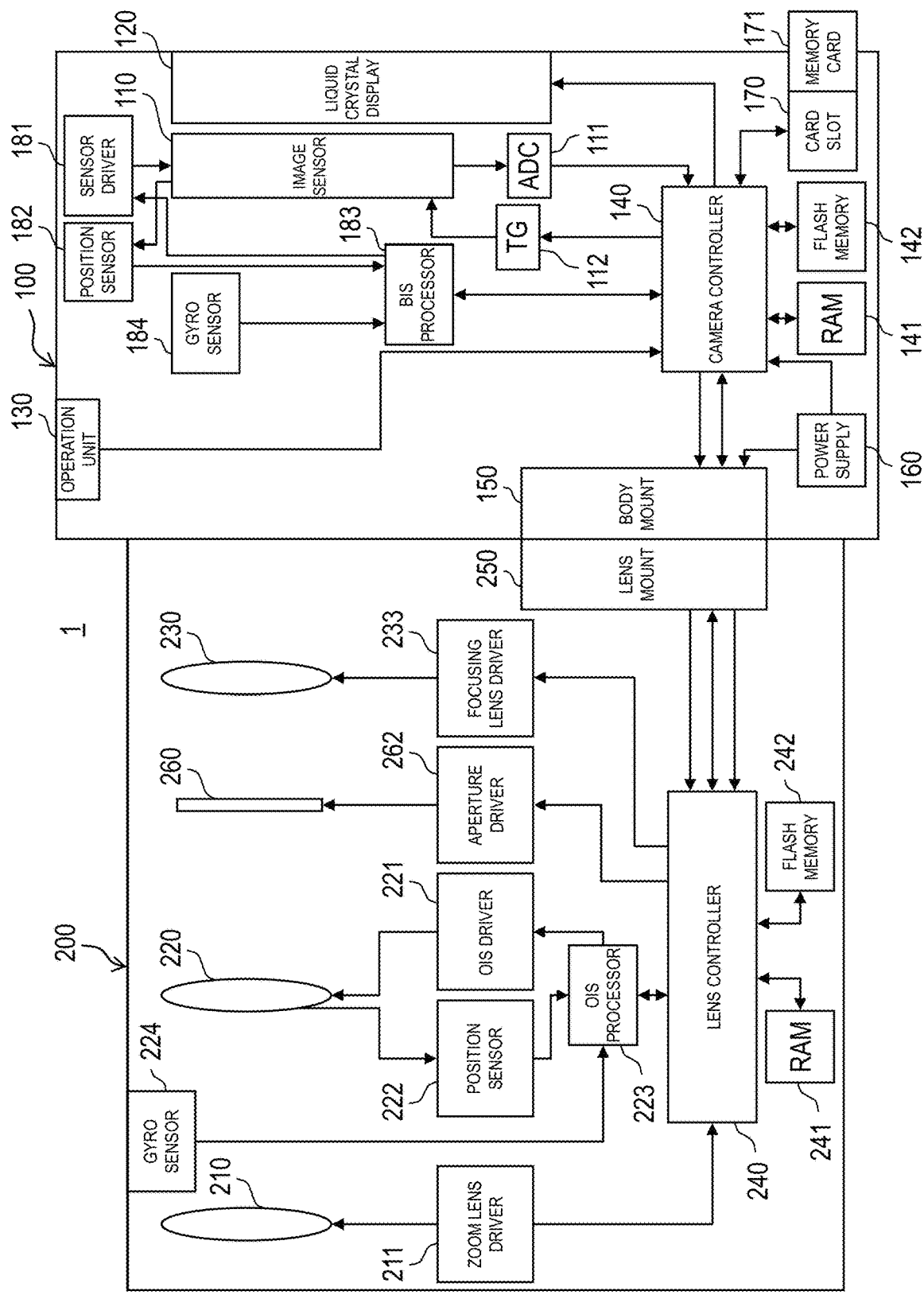
FIG. 1 is a block diagram showing a configuration of a digital camera according to a first exemplary embodiment.

FIG. 1 is a block diagram showing a configuration of the digital camera according to the first exemplary embodiment of the present disclosure. Digital camera 1 includes camera body 100 and interchangeable lens 200 detachably mounted to camera body 100.

1-1. Camera Body

Camera body 100 (an example of the imaging apparatus) includes image sensor 110, liquid crystal monitor 120, operation unit 130, camera controller 140, body mount 150, power supply 160, and card slot 170.

Camera controller 140 controls components, such as image sensor 110, according to an instruction input via a release button, thereby controlling the entire operation of digital camera 1. Camera controller 140 transmits a vertical synchronizing signal to timing generator (TG) 112. In parallel with such transmission, camera controller 140 generates an exposure synchronizing signal. Camera controller 140 periodically transmits the generated exposure synchronizing signal to lens controller 240 via body mount 150 and lens mount 250. Camera controller 140 uses dynamic random access memory (DRAM) 141 as a working memory when performing a control operation and image processing operation.

Image sensor 110 is an imaging device that captures a subject image formed through interchangeable lens 200 to generate image data. Image sensor 110 is, for example, a CCD, a complementary metal oxide semiconductor (CMOS) image sensor, or an n-channel metal oxide semiconductor (NMOS) image sensor. The generated image data is digitized by analog-to-digital (AD) converter (ADC) 111. The digitized image data is subjected to a predetermined image process under control of camera controller 140. The predetermined image process is at least any one of a gamma correction process, a white balance correction process, a flaw correction process, a YC conversion process, an electronic zoom process, and a JPEG compression process.

Image sensor 110 operates at timing controlled by timing generator 112. The image sensor generates at least any one of a still image, a motion picture, and a through image to be recorded. The through image is mainly a motion picture, and displayed in liquid crystal monitor 120 when the user intends to decide the composition for capturing a still image.

Liquid crystal monitor 120 displays various kinds of information including images, such as a through image, and a menu screen. Any other display devices such as an organic electro luminescence (EL) display device may be used in place of the liquid crystal monitor.

Operation unit 130 includes various kinds of operation members such as a release button for instructing a start of shooting, a mode dial for setting a shooting mode, and a power switch. Operation unit 130 also includes a touch panel overlaid on liquid crystal monitor 120. Note that the operation unit for setting a shooting mode may be of various types such as a button, dial, lever, or touch panel.

Card slot 170 is adapted to receive memory card 171 and controls memory card 171 under control of camera controller 140. Digital camera 1 can store image data into memory card 171 or read image data from memory card 171.

Power supply 160 is a circuit for supplying electric power to respective components in digital camera 1.

Body mount 150 is mechanically and electrically connectable to lens mount 250 of interchangeable lens 200. Body mount 150 can transmit and receive data to and from interchangeable lens 200 via lens mount 250. Body mount 150 transmits the exposure synchronizing signal received from camera controller 140 to lens controller 240 via lens mount 250. Body mount 150 also transmits other control signals received from camera controller 140 to lens controller 240 via lens mount 250. Body mount 150 also transmits signals received from lens controller 240 via lens mount 250 to camera controller 140. Body mount 150 also supplies electric power from power supply 160 to entire interchangeable lens 200 via lens mount 250.

Camera body 100 further includes, as a configuration for achieving a BIS function (that is, a function to correct a camera shake by motion picture sensor 110), gyro sensor 184 (an example of the shake detector) that detects shake of camera body 100 and BIS processor 183 (an example of the image stabilization unit) for controlling a shake correcting process based on the detection result of gyro sensor 184. Camera body 100 also includes sensor driver 181 (an example of the image stabilization unit) for motion picture sensor 110 and position sensor 182 for detecting a position of image sensor 110.

Sensor driver 181 can be achieved by a magnet and a planar coil, for example. Position sensor 182 is a sensor for detecting a position of image sensor 110 in a plane perpendicular to the optical axis of the optical system. Position sensor 182 can be achieved by a magnet and a Hall element, for example.

BIS processor 183 controls sensor driver 181 based on signals from gyro sensor 184 and position sensor 182 to move image sensor 110 in a plane perpendicular to the optical axis such that shake of camera body 100 is canceled. A range in which image sensor 110 can be driven by sensor driver 181 is mechanistically limited. The range in which image sensor 110 can be mechanistically driven is referred to as a "drivable range".

1-2. Interchangeable Lens

Interchangeable lens 200 includes the optical system, lens controller 240, and lens mount 250. The optical system includes zoom lens 210, OIS lens 220, focusing lens 230, and aperture 260.

Zoom lens 210 is for varying magnification of the subject image formed through the optical system. Zoom lens 210 includes one or more lenses. Zoom lens 210 is driven by zoom lens driver 211. Zoom lens driver 211 includes a zoom ring operable by a user. Zoom lens driver 211 may include a zoom lever and an actuator or a motor. Zoom lens driver 211 moves zoom lens 210 along the optical axis of the optical system according to the operation performed by the user.

Focusing lens 230 is for changing a focus state of the subject image formed on image sensor 110 with the optical system. Focusing lens 230 includes one or more lenses. Focusing lens 230 is driven by focusing lens driver 233.

Focusing lens driver 233 includes an actuator or a motor, and moves focusing lens 230 along the optical axis of the optical system under the control of lens controller 240. Focusing lens driver 233 is achieved by a direct current (DC) motor, a stepping motor, a servo motor, or an ultrasonic motor, for example.

OIS lens 220 (an example of the correction lens) is for correcting a blur of the subject image formed with the optical system of interchangeable lens 200 in the OIS function (that is, the function to correct a camera shake by moving OIS lens 220). OIS lens 220 moves in a direction in which the shake of digital camera 1 is canceled, thereby reducing a blur of the subject image on image sensor 110. OIS lens 220 includes one or more lenses. OIS lens 220 is driven by OIS driver 221 (an example of the image stabilization unit).

OIS driver 221 moves OIS lens 220 in a plane perpendicular to the optical axis of the optical system in response to control from OIS processor 223. A range in which OIS lens 220 can be driven by OIS driver 221 is mechanistically limited. The range in which OIS lens 220 can be mechanistically driven by OIS driver 221 is referred to as a drivable range. OIS driver 221 can be achieved by a magnet and a planar coil, for example. Position sensor 222 detects a position of OIS lens 220 in the plane perpendicular to the optical axis of the optical system. Position sensor 222 can be achieved by a magnet and a Hall element, for example. OIS processor 223 controls OIS driver 221 based on an output from position sensor 222 and an output from gyro sensor 224 (an example of the shake detector).

Aperture 260 adjusts an amount of light entering image sensor 110. Aperture 260 is driven by aperture driver 262 such that the degree of aperture is controlled. Aperture driver 262 includes a motor or an actuator.

Gyro sensors 184 and 224 respectively detect shake (shaking) in a yawing direction and a pitch direction based on an angular variation, that is, an angular velocity, per unit time of digital camera 1. Gyro sensor 184 outputs an angular velocity signal indicating an amount of the detected shake (angular velocity) to BIS processor 183. Gyro sensor 224 outputs an angular velocity signal indicating an amount of the detected shake (angular velocity) to OIS processor 223. The angular velocity signals output from gyro sensors 184 and 224 may include a wide range of frequency components due to a camera shake, mechanical noise, and the like. The shake detector in the present disclosure can employ other sensors that can detect shake of digital camera 1, in place of the gyro sensor.

Each of camera controller 140 and lens controller 240 is an example of the controller in the present disclosure. Camera controller 140 and lens controller 240 may include a hard-wired electronic circuit or a microcomputer using a program, for example. For example, camera controller 140 and lens controller 240 can be achieved by a processor such as a central processing unit (CPU), a micro processing unit (MPU), a graphics processing unit (GPU), a digital signal processor (DSP), a field-programmable gate array (FPGA), and an application specific integrated circuit (ASIC).

1-3. BIS Processor

Figure 2:
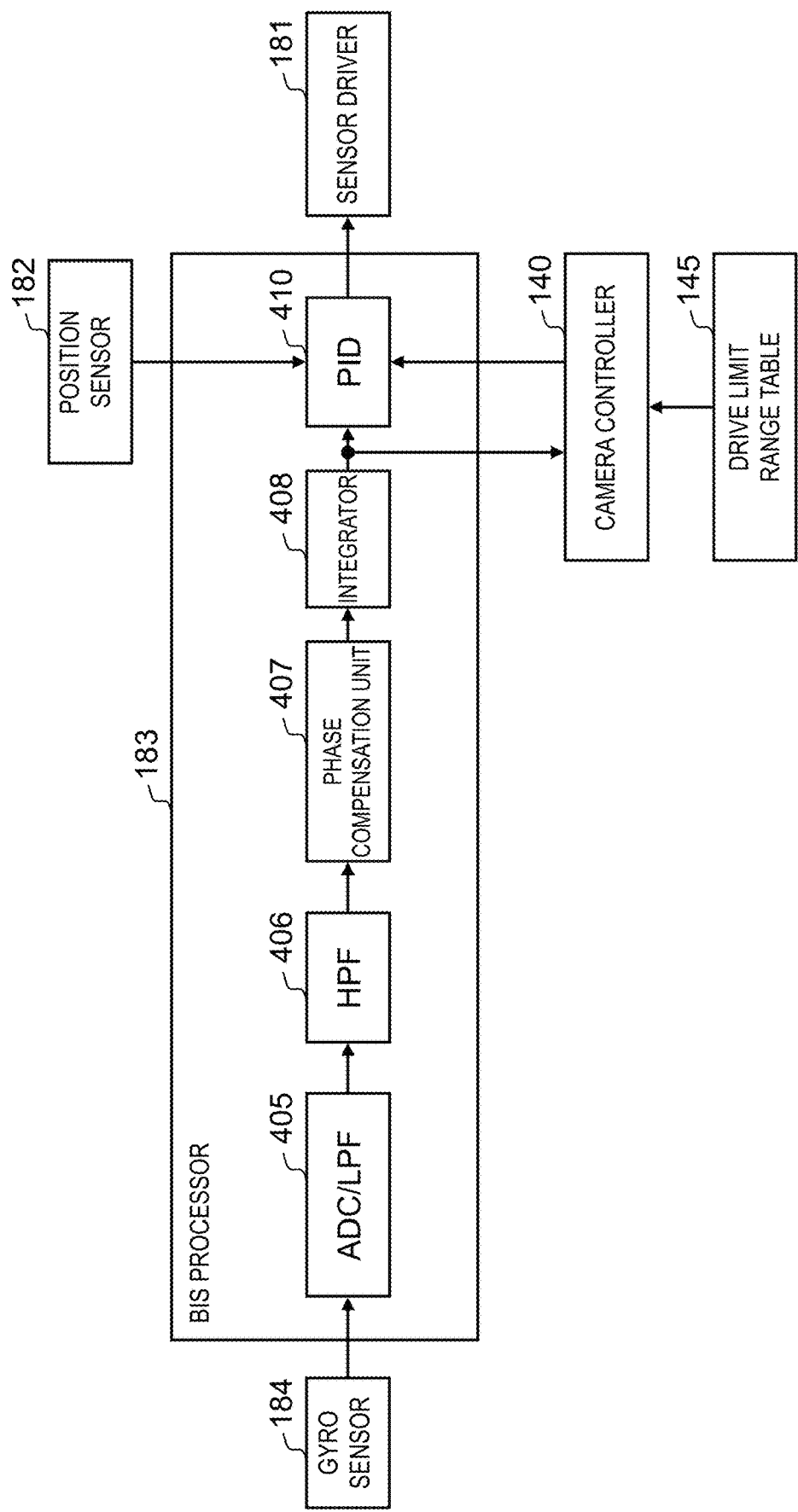
FIG. 2 is a block diagram showing a configuration of a body image stabilizer (BIS) processor in the digital camera according to the first exemplary embodiment.

The configuration of BIS processor 183 of camera body 100 will be described with reference to FIG. 2. BIS processor 183 includes ADC/low-pass filter (LPF) 405, high-pass filter (HPF) 406, phase compensation unit 407, integrator 408, and proportional-integral-differential (PID) controller 410.

ADC/LPF 405 converts the angular velocity signal from gyro sensor 184 into a digital format from an analog format. ADC/LPF 405 also cuts off high-frequency components of the angular velocity signal which has been converted into the digital format, in order to extract only the shake of digital camera 1 with noise being eliminated. A frequency of a camera shake by a shooter is low such as about 1 to 10 Hz, based on which a cut-off frequency of LPF is set. If noise is not a significant problem, the function of LPF can be eliminated.

In order to cut off drift components, HPF 406 cuts off predetermined low-frequency components included in the signal received from ADC/LPF 405.

Phase compensation unit 407 corrects a phase delay of the signal received from HPF 406 due to sensor driver 181 or the like.

Integrator 408 integrates the signal, which has been input from phase compensation unit 407 and which indicates the angular velocity of shake (shaking), to generate a signal (hereinafter referred to as a "shake detection signal") indicating the angle of the shake (shaking). The shake detection signal from integrator 408 is input to PID controller 410.

PID controller 410 generates a drive signal for image sensor 110 based on the output from position sensor 182 and the output from integrator 408, and outputs the generated drive signal to sensor driver 181. Sensor driver 181 drives image sensor 110 based on the drive signal.

1-4. OIS Processor

Figure 3:
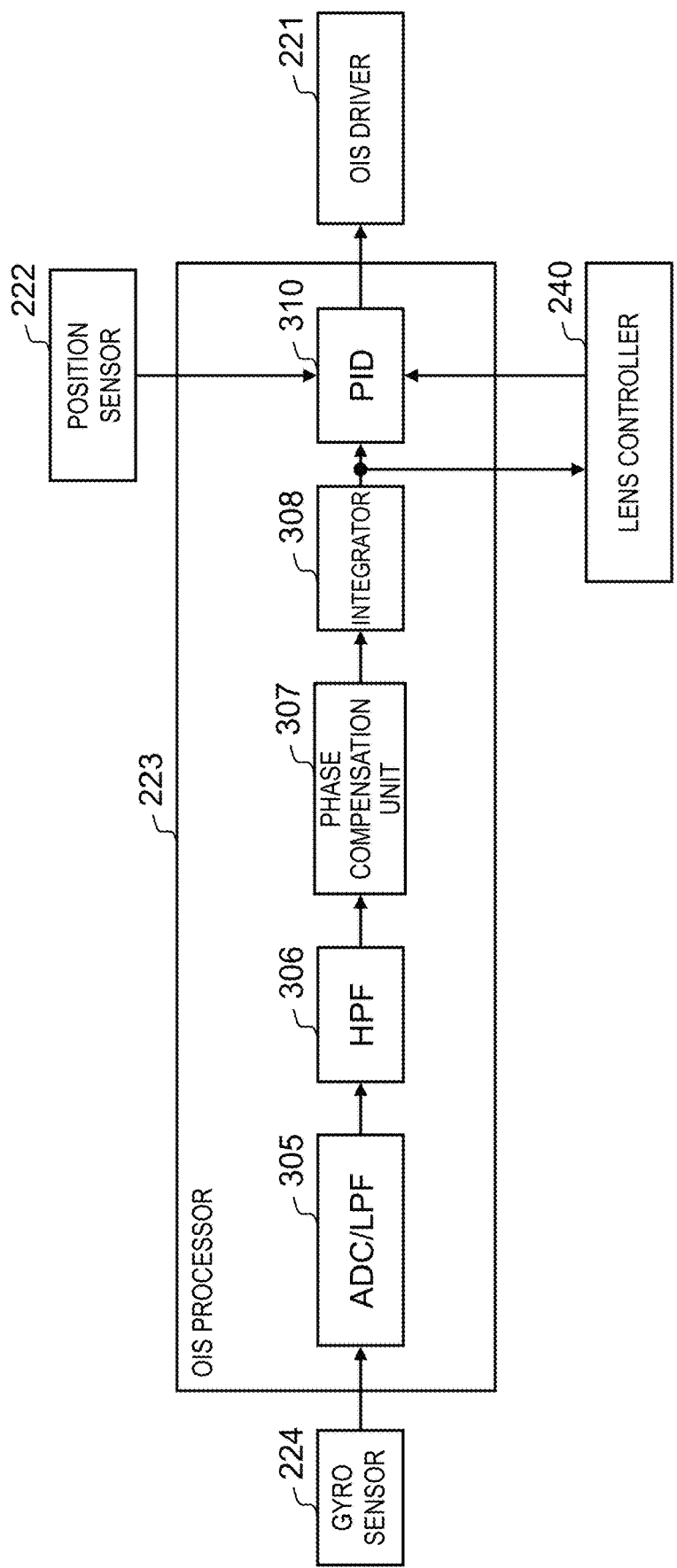
FIG. 3 is a block diagram showing a configuration of an optical image stabilizer (OIS) processor in the digital camera according to the first exemplary embodiment.

The configuration of OIS processor 223 of interchangeable lens 200 will be described with reference to FIG. 3. OIS processor 223 includes ADC/LPF 305, HPF 306, phase compensation unit 307, integrator 308, and PID controller 310.

ADC/LPF 305 converts the angular velocity signal from gyro sensor 224 into a digital format from an analog format. ADC/LPF 305 also cuts off high-frequency components of the angular velocity signal which has been converted into the digital format, in order to extract only the shake of digital camera 1 with noise being eliminated. A frequency of a camera shake by a shooter is low such as about 1 to 10 Hz, based on which a cut-off frequency of LPF is set. If noise is not a significant problem, the function of LPF can be eliminated.

In order to cut off drift components, HPF 306 cuts off predetermined low-frequency components included in the signal received from ADC/LPF 305.

Phase compensation unit 307 corrects a phase delay of the signal received from HPF 306 due to OIS driver 221 and lens-to-body communication or the like.

Integrator 308 integrates the signal, which has been input from phase compensation unit 307 and which indicates the angular velocity of shake (shaking), to generate a shake detection signal indicating the angle of the shake (shaking). The shake detection signal from integrator 308 is input to PID controller 310.

PID controller 310 performs PID control based on a difference between the input shake detection signal and current position information of OIS lens 220 received from position sensor 222, thereby generating a drive signal to be transmitted to OIS driver 221. OIS driver 221 drives OIS lens 220 based on the drive signal.

2. Operation

An image stabilization operation of digital camera 1 having the above configuration will be described.

BIS processor 183 in camera body 100 generates a drive signal for driving image sensor 110 based on the detection signal from gyro sensor 184 and position information from position sensor 182, and transmits the generated drive signal to sensor driver 181. Sensor driver 181 moves image sensor 110 in a plane perpendicular to the optical axis such that the shake detected by gyro sensor 184 is canceled in response to the drive signal from BIS processor 183.

OIS processor 223 in interchangeable lens 200 generates a drive signal for driving OIS lens 220 based on the detection signal from gyro sensor 224 and position information from position sensor 222, and transmits the generated drive signal to OIS driver 221. OIS driver 221 moves OIS lens 220 in a plane perpendicular to the optical axis such that the shake detected by gyro sensor 224 is canceled in response to the drive signal.

Only the OIS function or the BIS function may be activated or both functions may be simultaneously activated for an image stabilization.

As described above, digital camera 1 activates the image stabilization function based on the detected shake signal, thereby reducing an influence of a camera shake (image blur) on a captured image.

Figure 4:
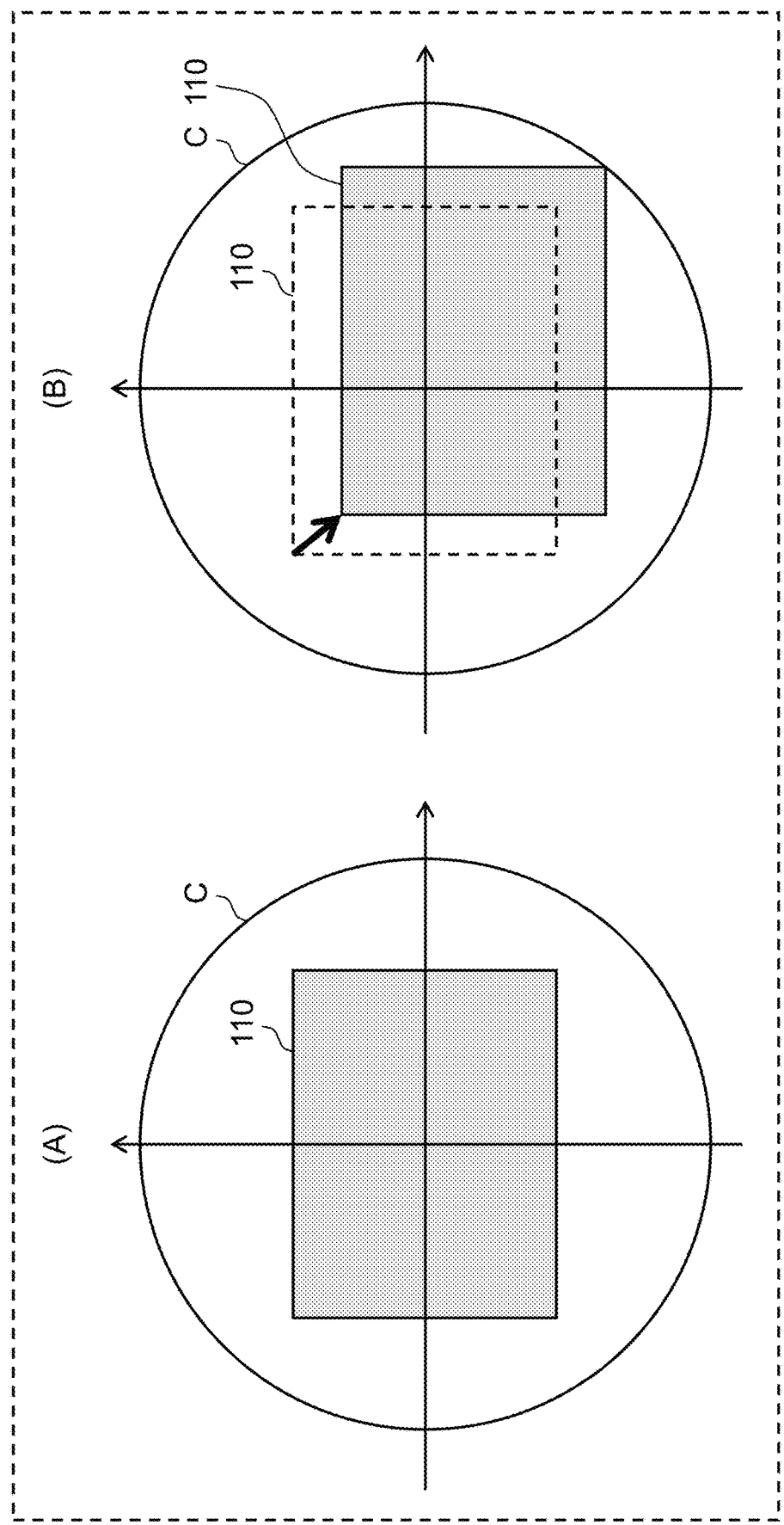
FIG. 4 is a view for describing a relative positional relationship between an image sensor and an image circle.

When OIS lens 220 or image sensor 110 is moved by the OIS process or BIS process, the relative positional relationship between image sensor 110 and image circle C varies. Note that the image circle indicates a circular range in which light passing through a lens is focused. FIG. 4 is a view for describing a relative positional relationship between image sensor 110 and the image circle formed by the optical system of interchangeable lens 200. Part (A) of FIG. 4 is a view for describing the relative positional relationship between image sensor 110 and image circle C when neither the OIS process nor the BIS process is activated. In this case, image sensor 110 is in the center of image circle C. Part (B) of FIG. 4 is a view for describing the relative positional relationship between image sensor 110 and image circle C when the BIS process or the OIS process is activated as much as possible. As shown in part (B) of FIG. 4, the range of movement of image sensor 110 is limited such that image sensor 110 does not go beyond image circle C. The relative positional relationship between image sensor 110 and image circle C also varies when OIS lens 220 is moved without image sensor 110. In such a case, the range of movement of OIS lens 220 is limited such that image sensor 110 does not go beyond image circle C as shown in part (B) of FIG. 4.

Figure 5:
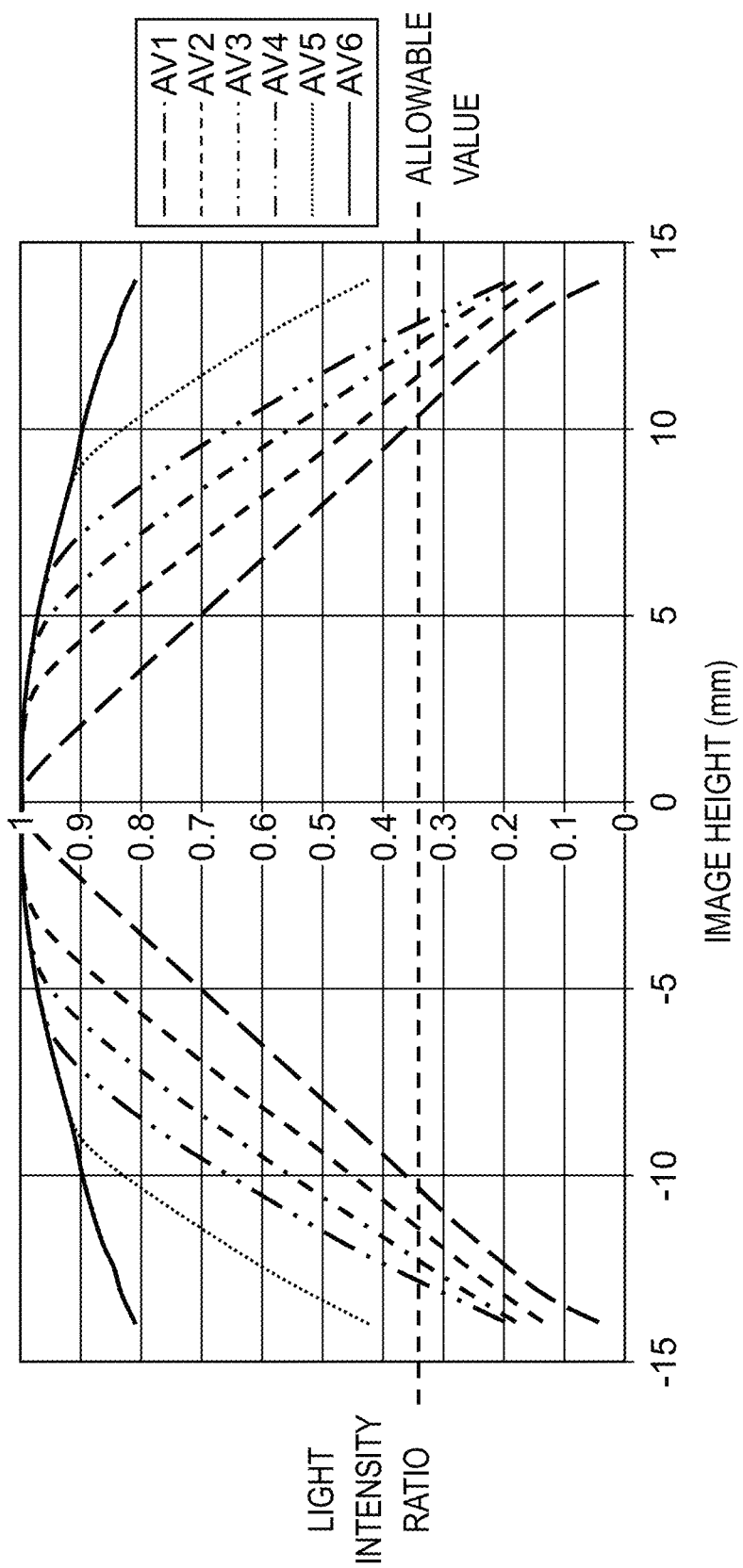
FIG. 5 is a diagram showing optical characteristics (light intensity ratios to image heights at various aperture values (AVs)) of an interchangeable lens.

FIG. 5 is a diagram showing optical characteristics of interchangeable lens 200 (optical system) indicating light falloff at edges. FIG. 5 shows a variation in a light intensity ratio (light attenuation rate) relative to an image height for six types of AVs which are AV 1 to AV 6. The light intensity ratio (that is, light attenuation rate) is calculated based on light intensity when the image height is 0 mm. With reference to FIG. 5, it is understood that the light intensity ratio tends to decrease as the image height becomes larger (that is, with nearness to the outer periphery of the image circle). Further, the comparison with the same image height indicates that the light attenuation rate is greater as the AV is smaller. The AV has a correlation to an aperture value (F value). Therefore, FIG. 5 shows that the light attenuation rate becomes greater as the aperture value (F value) is smaller (the aperture degree is larger).

As described above, interchangeable lens 200 has optical characteristics of light falloff at edges. Accordingly, when image sensor 110 moves from the center of image circle C as a result of the movement of OIS lens 220 or image sensor 110 by the image stabilization, light intensity is decreased in an area closer to the outer periphery of image circle C, and thus, image quality is degraded. Particularly when OIS lens 220 or image sensor 110 is greatly moved because the detected camera shake amount is large, the brightness at the edges of the captured image is greatly reduced, and thus, image quality degradation is noticeable.

Digital camera 1 according to the present exemplary embodiment reduces image quality degradation (reduction in brightness at edges of an image) which could be caused by the movement of image sensor 110 relative to image circle C when the image stabilization described above is performed. Configurations and operations for achieving the above-mentioned reduction in image quality degradation will be described below.

2.1 Drive Limit Range Table

In order to reduce a decrease in brightness at edges of an image which could be caused during an image stabilization, digital camera 1 controls the aperture value according to a detected camera shake amount. Specifically, digital camera 1 sets an allowable value which is an allowable lower limit value of a light intensity ratio. Digital camera 1 also limits the range in which OIS lens 220 or image sensor 110 is to be driven for the image stabilization to a certain range (hereinafter referred to as a "drive limit range") within the drivable range. The drive limit range indicates a range in which a light intensity ratio larger than or equal to the allowable value is obtained when OIS lens 220 or image sensor 110 is driven within such a range. The light attenuation rate is kept less than or equal to a prescribed value within the drive limit range. Therefore, even when image sensor 110 is relatively away from the center of the image circle, the influence of light falloff at edges of the image can be reduced.

Figure 6:
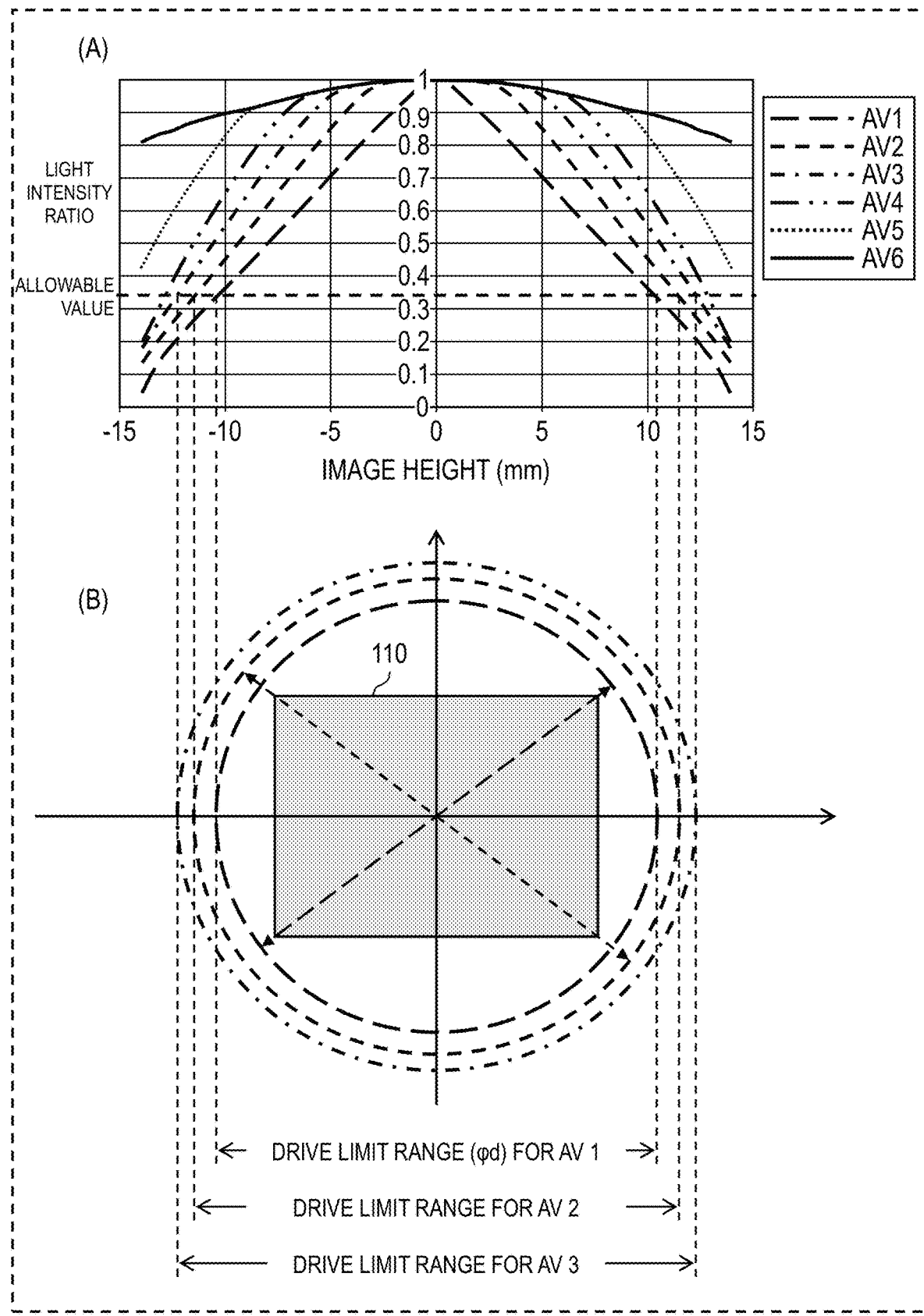
FIG. 6 is a diagram for describing a drive limit range of the image sensor in BIS, the drive limit range varying according to AVs.

FIG. 6 is a diagram for describing the drive limit range (range in which the light intensity ratio is larger than or equal to the allowable value). In the present exemplary embodiment, the allowable value of the light intensity ratio is set to be 0.33, for example. Part (A) of FIG. 6 shows optical characteristics of interchangeable lens 200, and part (B) of FIG. 6 shows drive limit ranges (ranges in which the light intensity ratio is larger than or equal to the allowable value in the image circle) with respect to AV 1 to AV 3.

OIS lens 220 or image sensor 110 is driven such that image sensor 110 is located within the range in which the light intensity ratio becomes larger than or equal to the allowable value in the image circle. As shown in part (B) of FIG. 6, the range where the light intensity ratio becomes larger than or equal to the allowable value (0.33) in the image circle is larger when the AV, that is, the aperture value is larger. In other words, as the AV, that is, the aperture value is larger, the drive limit range for OIS lens 220 or image sensor 110 during an image stabilization becomes larger. That is, the drive limit range can be changed by controlling the aperture value.

Digital camera 1 stores drive limit range table 145 as information indicating the drive limit range with respect to interchangeable lens 200. Interchangeable lens 200 holds, in flash memory 242, optical characteristic information indicating optical characteristics inherent to interchangeable lens 200 as shown in FIG. 5 or part (A) of FIG. 6. The optical characteristic information includes information indicating a variation in light intensity ratio relative to an image height for various AVs, regarding interchangeable lens 200. When the power supply of digital camera 1 is turned on, camera controller 140 in camera body 100 reads the optical characteristic information from flash memory 242 of interchangeable lens 200, generates drive limit range table 145 based on the optical characteristic information and the allowable value, and stores generated drive limit range table 145 into flash memory 142. For convenience of description, the operation when the image stabilization by the BIS function is executed will be described below.

FIG. 7 is a diagram showing configuration examples of drive limit range table 145 for the BIS with respect to two types of focus positions (focal lengths). Part (A) of FIG. 7 shows drive limit range table 145 when the focal length is infinite, and part (B) of FIG. 7 shows drive limit range table 145 when the focal length is 1 m. In drive limit range table 145, a zoom position, AV, and drive limit range (φd) for the BIS (image sensor 110) are associated with one another for each focus position (focal length).

Figure 8:
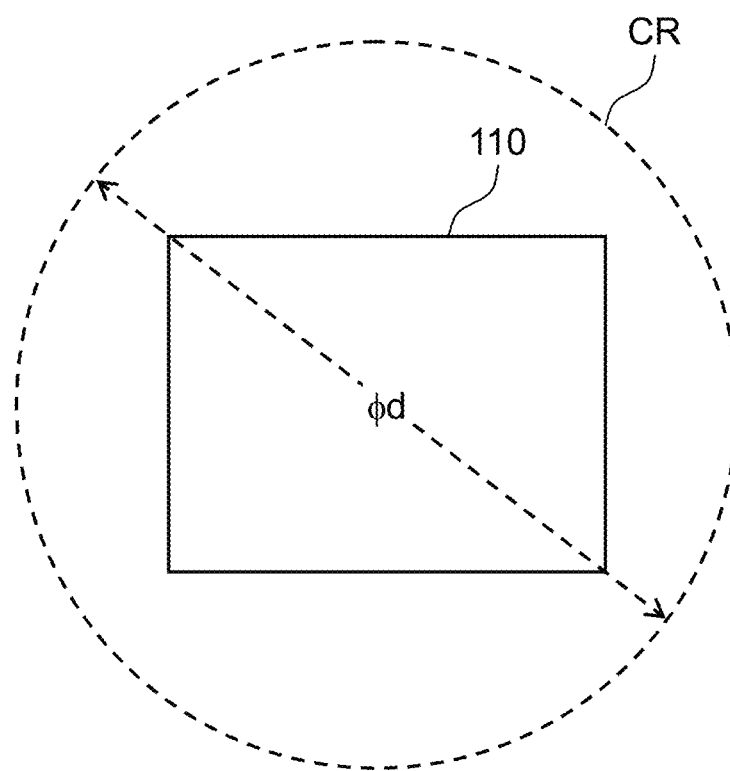
FIG. 8 is a diagram for describing a drive limit range of the image sensor in BIS.

Drive limit range (φd) is represented by a diameter of image circle region CR in which the light intensity ratio becomes larger than or equal to the allowable value, as shown in FIG. 8. During the BIS, image sensor 110 is driven within a range falling within region CR with diameter φd. Referring to part (A) of FIG. 7, when the focal length is infinite, the zoom position is Zoom 4, and the AV is AV 3, for example, the drive limit range (φd) for the BIS is 22.21 mm. It is also found that, if the AV is changed to AV 4, the drive limit range for the BIS becomes 22.36 mm, which is larger than the drive limit range when the AV is AV 3.

Figure 9:
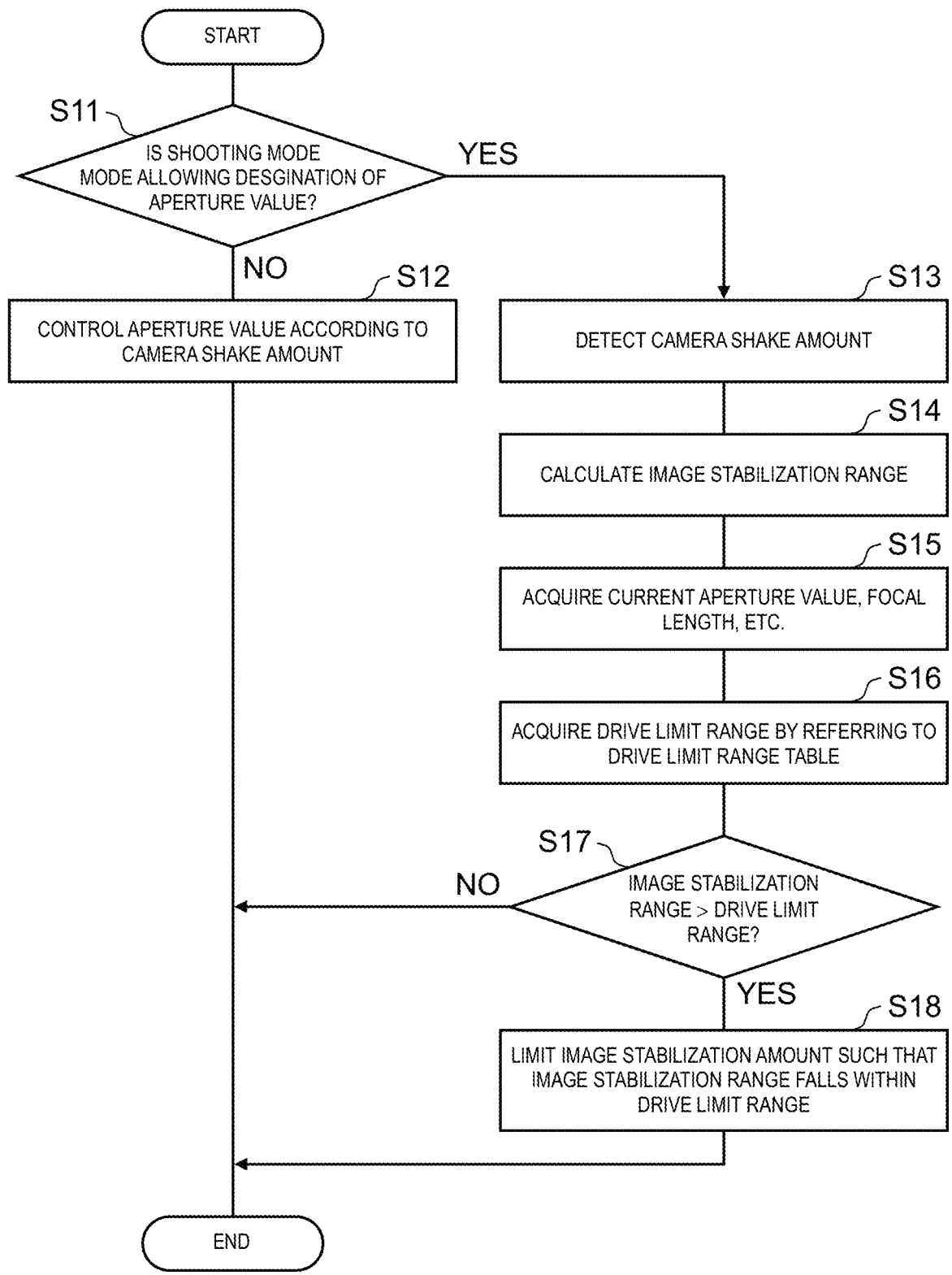
FIG. 9 is a flowchart regarding an image stabilization process of the digital camera when a motion picture is captured.

2.2 Setting of Aperture Value During Image Stabilization when Motion Picture is Captured FIG. 9 is a flowchart regarding the image stabilization process of digital camera 1 when a motion picture is captured. This process is executed in a predetermined cycle while the motion picture is captured.

Camera controller 140 determines whether the currently set shooting mode is a mode (an example of a first mode in the present disclosure) in which the aperture value is designated by the user (S11). The mode in which the aperture value is designated by the user is an aperture priority mode (A mode) or a manual mode (M mode). A program mode (P mode) and a shutter priority mode (S mode) are not the mode in which the aperture value is designated by the user.

When the currently set shooting mode is the mode in which the aperture value is designated by the user, for example, A mode or M mode (YES in S11), camera controller 140 activates the BIS based on the detected camera shake amount, thereby canceling the camera shake. In this case, when an image stabilization range calculated based on the detected camera shake amount exceeds the drive limit range, camera controller 140 limits the image stabilization amount such that the image stabilization range falls within the drive limit range.

Specifically, BIS processor 183 detects the camera shake amount based on the detection signal from gyro sensor 184 (S13). Camera controller 140 acquires information (output from integrator 408) indicating the camera shake amount from BIS processor 183, and calculates a drive range (hereinafter referred to as an "image stabilization range") necessary for the image stabilization (S14). To this end, camera controller 140 calculates, from the detected camera shake amount, the image stabilization amount which is an amount of movement of image sensor 110 necessary for canceling the camera shake. Camera controller 140 obtains the image stabilization range based on the image stabilization amount and the size of image sensor 110. Specifically, camera controller 140 calculates, as the image stabilization range, a distance from the center of image sensor 110 when the BIS is not activated to one of corners of image sensor 110 when the BIS is activated. For example, when diagonal movement of image sensor 110 by an amount of α is necessary for canceling the camera shake, the image stabilization range is calculated as (diagonal length of image sensor+α).

Camera controller 140 acquires information such as the aperture value, the focal length, the focal length, and the zoom position which are currently set (S15). Camera controller 140 obtains the drive limit range for the BIS by referring to drive limit range table 145 based on the acquired information such as the aperture value, the focal length, the focal length, and the zoom position (S16). For example, when the focal length is infinite, the zoom position is Zoom 1, and the AV is AV 6, the drive limit range (φd) for the BIS is 22.18 mm with reference to part (A) of FIG. 7.

Camera controller 140 compares the image stabilization range with the drive limit range for the BIS (S17). When the image stabilization range is larger than the drive limit range (YES in S17), camera controller 140 limits the image stabilization amount such that the image stabilization range falls within the drive limit range (S18). With this configuration, the BIS is not activated beyond the drive limit range, whereby the influence of light falloff can be reduced. If the image stabilization range is smaller than or equal to the drive limit range (NO in S17), camera controller 140 executes the image stabilization operation based on the image stabilization amount calculated from the detected camera shake amount.

Meanwhile, when the currently set shooting mode is not the mode in which the aperture value is designated by the user (NO in S11), for example, when the shooting mode is the P mode or the S mode, camera controller 140 controls the aperture value according to the camera shake amount (S12). This process will be specifically described with reference to FIG. 10.

Figure 10:
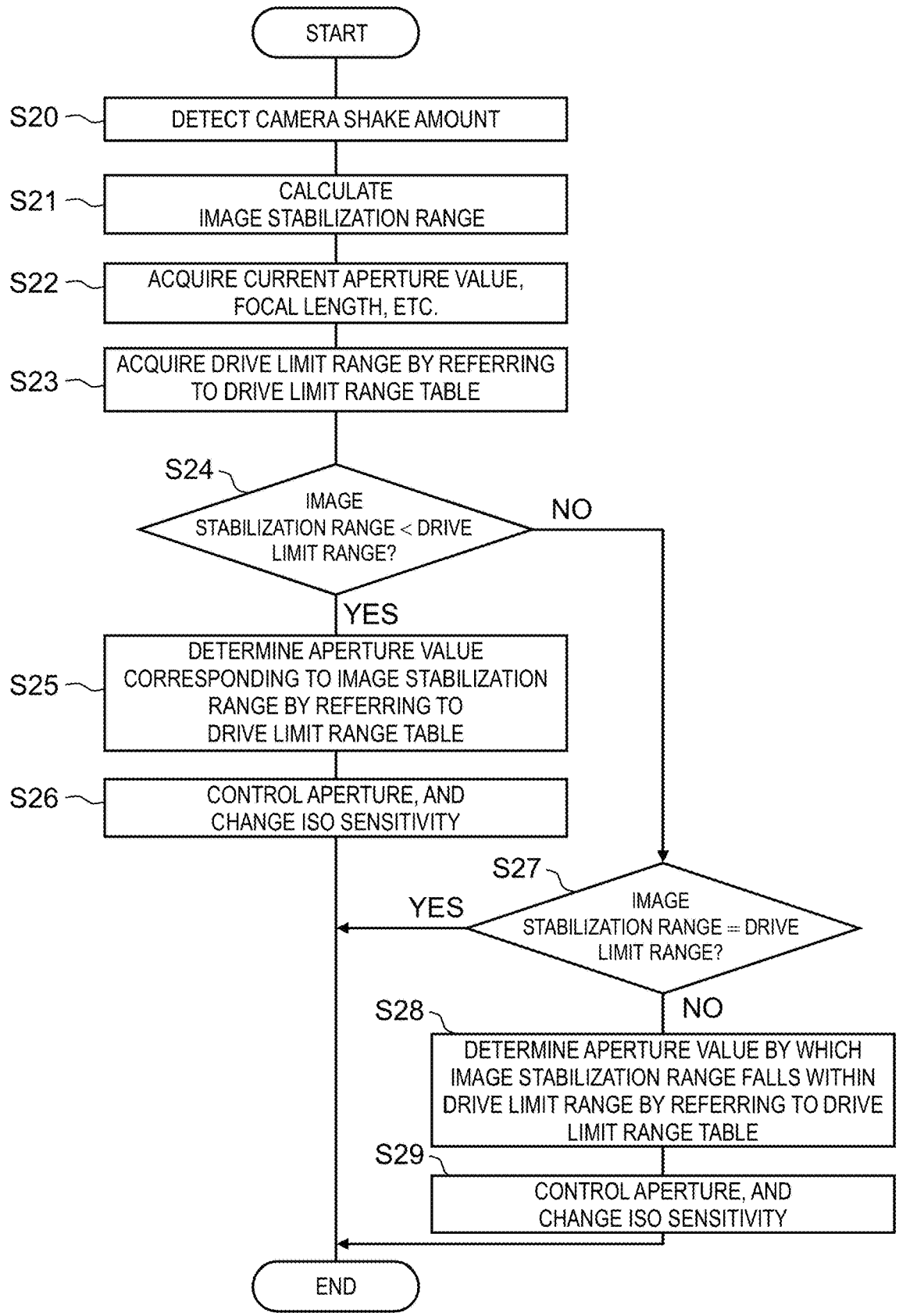
FIG. 10 is a flowchart showing how to control an aperture value according to an image stabilization amount during capturing of a motion picture.

FIG. 10 is a flowchart showing a specific process for controlling the aperture value according to the camera shake amount (S12) during capturing of a motion picture.

BIS processor 183 detects a camera shake amount based on the detection signal from gyro sensor 184 (S20). Camera controller 140 acquires information (output from integrator 408) indicating the camera shake amount from BIS processor 183, and calculates an image stabilization range (S21).

Camera controller 140 acquires information such as the aperture value, the focal length, the focal length, and the zoom position which are currently set (S22). Camera controller 140 obtains the drive limit range for the BIS by referring to drive limit range table 145 based on the acquired aperture value, focal length, focal length, and zoom position (S23). For example, when the focal length is infinite, the zoom position is Zoom 1, and the AV is AV 6, the drive limit range (φd) for the BIS is 22.18 mm with reference to part (A) of FIG. 7. Note that the AV can be obtained through conversion from the aperture value.

Camera controller 140 compares the image stabilization range with the drive limit range for the BIS (S24).

When the image stabilization range is smaller than the drive limit range (YES in S24), camera controller 140 obtains the AV, that is, the aperture value, based on the image stabilization range by referring to drive limit range table 145 (S25). In this case, the aperture is controlled to be opened more than the current state. This process enables capturing an image with higher light intensity, while achieving necessary image stabilization.

For example, when the image stabilization range calculated based on the detection signal from gyro sensor 184 is 22.00 mm while the drive limit range (φd) for the BIS is 22.18 mm as described above, the image stabilization range is smaller than the drive limit range, so that camera controller 140 obtains the AV, that is, the aperture value, based on the image stabilization range by referring to drive limit range table 145. Specifically, since the focal length is infinite and the zoom position is Zoom 1, camera controller 140 obtains the AV corresponding to the image stabilization amount of 22.00 mm by referring to drive limit range table 145 in part (A) of FIG. 7. The drive limit range is 21.93 mm when the AV is AV 4, and the drive limit range is 22.08 mm when the AV is AV 5. Therefore, camera controller 140 performs interpolation using these values to calculate the AV corresponding to the image stabilization amount of 22.00 mm. In this case, 4.46 is obtained as the AV. The aperture value is calculated from the obtained AV (=4.46). It is to be noted that the calculated aperture value (AV) may not be set due to the resolution of digital camera 1. In such a case, a value closer to and larger than the calculated aperture value (AV) may be selected from among aperture values (AVs) that can be set to digital camera 1, and the selected value may be set.

After determining the aperture value, camera controller 140 controls aperture 260 of interchangeable lens 200 according to the determined aperture value (S26). Camera controller 140 also sets ISO sensitivity such that an appropriate exposure is obtained based on the determined aperture value and the like (S26). When a motion picture is captured, a frame rate, that is, a shutter speed is constant. Therefore, when the aperture value is changed, the ISO sensitivity is adjusted to obtain the appropriate exposure.

On the other hand, when the image stabilization range is larger than or equal to the drive limit range (NO in S24), camera controller 140 determines whether the image stabilization range is equal to the drive limit range (S27). If the image stabilization range is equal to the drive limit range (YES in S27), camera controller 140 keeps the current aperture value.

If the image stabilization range is larger than the drive limit range (NO in S27), camera controller 140 determines an aperture value providing the drive limit range larger than or equal to the image stabilization range by referring to drive limit range table 145 (S28). In this case, if the current aperture value is kept, brightness may be reduced at edges of the image, which leads to image quality degradation. In view of this, aperture 260 is further narrowed to extend the drive limit range, whereby the image quality degradation can be reduced.

For example, it is found from part (A) of FIG. 7 that, when the focal length is infinite, the zoom position is Zoom 1, and the AV is AV 4, the drive limit range (φd) for the BIS is 21.93 mm. If the image stabilization range is 22.00 mm in this case, the image stabilization range is larger than the drive limit range, and therefore, reduction in brightness at edges of the image may occur. In view of this, the AV is changed to AV 5 from AV 4, by which the drive limit range is changed to 22.08 mm. With this operation, the image stabilization range becomes smaller than the drive limit range, whereby the image quality degradation can be reduced.

Then, camera controller 140 controls such that aperture 260 has the determined aperture value, and sets the ISO sensitivity based on the aperture value and the like (S29).

With the aperture 260 being controlled to have the aperture value set as described above, the image stabilization operation by BIS processor 183 is executed.

As described above, in the present exemplary embodiment, image sensor 110 is driven within the drive limit range in which the light intensity ratio larger than or equal to the allowable value is obtained during the image stabilization operation, while a motion picture is captured. Specifically, if the shooting mode is not a mode in which the aperture value is designated by the user, the aperture value is set such that the drive limit range larger than or equal to the image stabilization range is achieved. On the other hand, if the shooting mode is a mode in which the aperture value is designated by the user, the image stabilization amount is limited such that the image stabilization range does not exceed the drive limit range. Thus, image sensor 110 is driven within the range in which the light intensity ratio larger than or equal to the allowable value is obtained, whereby light falloff at edges caused by the image stabilization can be reduced.

Figure 11:
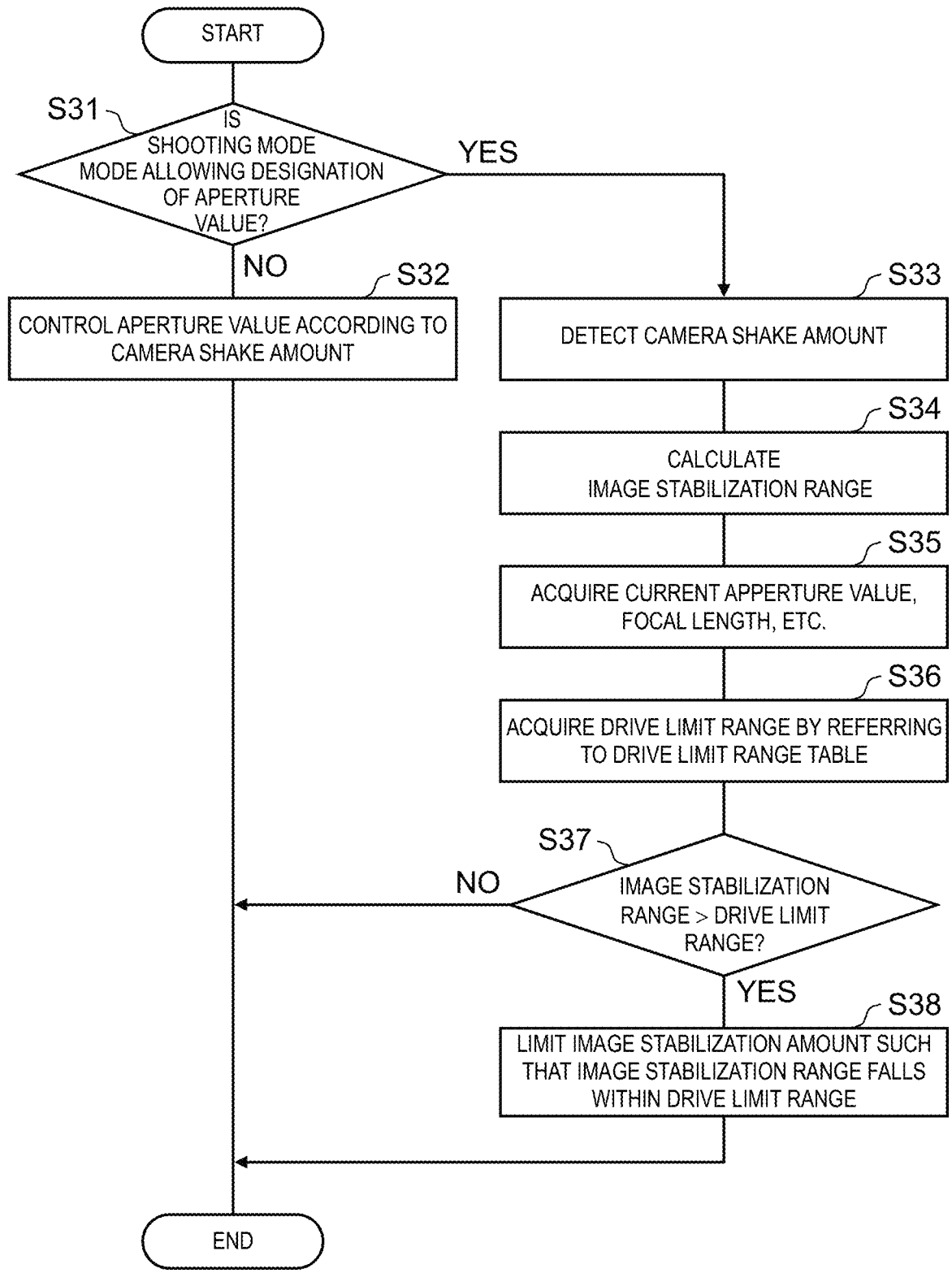
FIG. 11 is a flowchart regarding an image stabilization process of the digital camera when a still image is captured.

2.3 Setting of Aperture Value During Image Stabilization when Still Image is Captured FIG. 11 is a flowchart regarding an image stabilization process of digital camera 1 when a still image is captured. This process is executed in a predetermined cycle.

Camera controller 140 determines whether the currently set shooting mode is a mode (for example, A mode or M mode) in which the aperture value is designated by the user (S31).

When the currently set shooting mode is the mode in which the aperture value is designated by the user (YES in S31), camera controller 140 executes steps S33 to S38. The processes in steps S33 to S38 are the same as the processes in steps S13 to S18 in the flowchart shown in FIG. 9, so that they will not be described below.

On the other hand, if the currently set shooting mode is not the mode in which the aperture value is designated by the user (NO in S31), for example, when the shooting mode is the P mode or the S mode, camera controller 140 controls the aperture value based on the camera shake amount (S32). This process will be specifically described with reference to FIG. 12.

Figure 12:
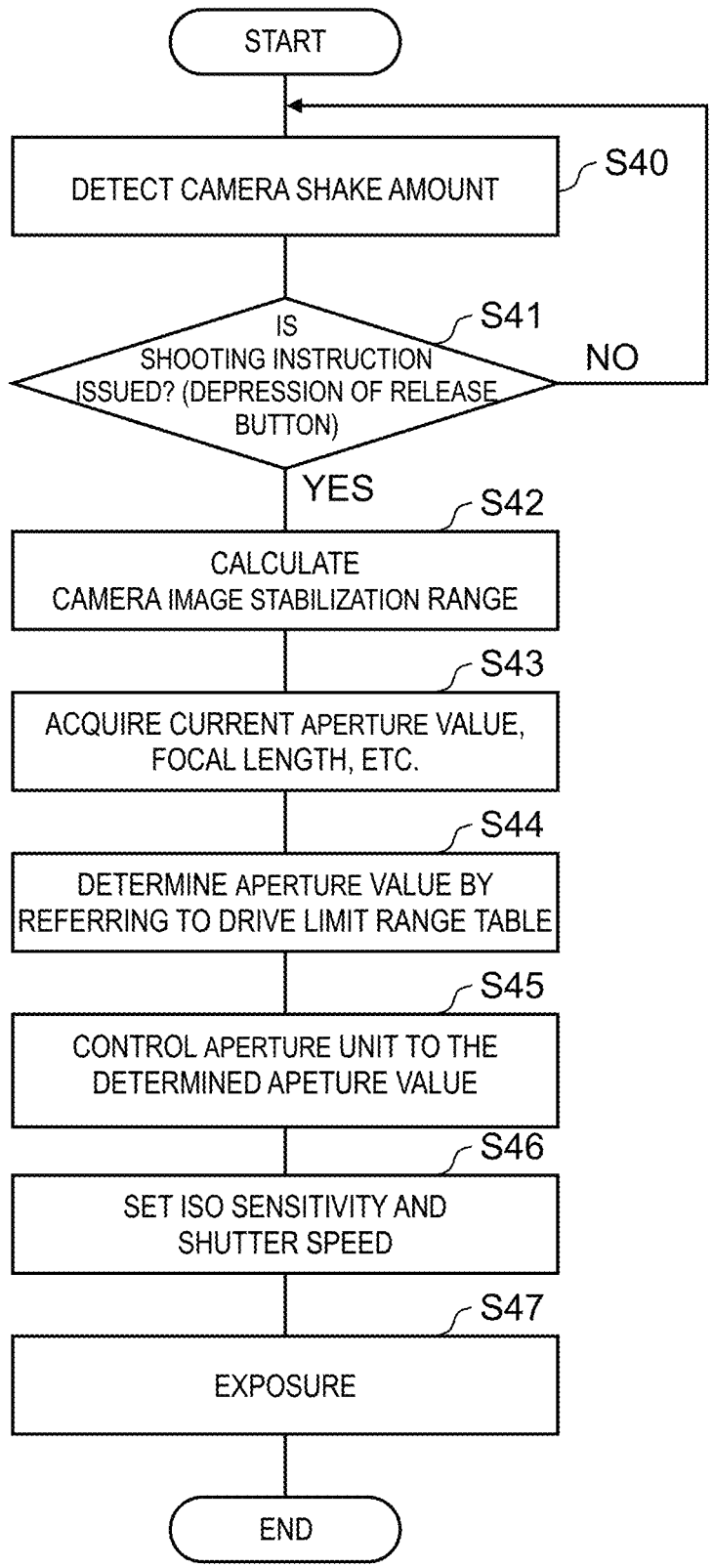
FIG. 12 is a flowchart showing how to control an aperture value according to an image stabilization amount during capturing of a still image.

FIG. 12 is a flowchart showing a specific process for controlling the aperture value based on the camera shake amount (S32) when a still image is captured.

When in a standby state during a still image shooting mode, digital camera 1 displays an image captured with image sensor 110 in liquid crystal monitor 120 as a live view image. This operation is referred to as a live view operation. During the live view operation, BIS processor 183 periodically detects the camera shake amount based on the detection signal from gyro sensor 184 (S40).

The user presses the release button to instruct digital camera 1 to start shooting an image. While the user does not press the release button (NO in S41), camera controller 140 repeats the detection of camera shake amount (S40). When the instruction to start shooting an image is issued by the depression of the release button by the user (YES in S41), camera controller 140 executes the following processes. When receiving the instruction to shoot an image, that is, when detecting the depression of the release button (YES in S41), camera controller 140 acquires information indicating the camera shake amount from BIS processor 183, and calculates the image stabilization range (S42). Note that the camera shake amount to be acquired is the camera shake amount detected in step S40 just before the depression of the release button in step S41. Camera controller 140 also acquires information such as the aperture value, the focal length, the focal length, and the zoom position which are currently set (S43).

With reference to drive limit range table 145, camera controller 140 obtains the aperture value (AV) based on the image stabilization range calculated in step S42, using the acquired focal length, focal length, aperture value, and zoom position (S44). For example, when the focal length is infinite, the zoom position is Zoom 1, and the image stabilization amount is 22.00 mm, camera controller 140 obtains the AV corresponding to the image stabilization amount of 22.00 mm by referring to the table in part (A) of FIG. 7. In the present exemplary embodiment, 4.46 is obtained as the AV. Then, camera controller 140 calculates the aperture value from the obtained AV (=4.46).

After determining the aperture value, camera controller 140 controls such that aperture 260 has the determined aperture value (S45). With the aperture 260 being controlled to have the aperture value set as described above, the image stabilization operation by BIS processor 183 is executed.

Camera controller 140 also sets ISO sensitivity and shutter speed such that an appropriate exposure is obtained, in consideration of the determined aperture value and the like (S46). Camera controller 140 performs exposure with the set aperture value, shutter speed, and the like (S47) to capture a still image.

As described above, camera controller 140 also drives image sensor 110 within the drive limit range in which the light intensity ratio larger than or equal to the allowable value is obtained during the image stabilization operation, when a still image is captured. Specifically, if the shooting mode is not the mode in which the aperture value is designated by the user, camera controller 140 sets the aperture value such that the drive limit range larger than or equal to the image stabilization range is achieved. On the other hand, if the shooting mode is a mode in which the aperture value is designated by the user, the image stabilization amount is limited such that the image stabilization range does not exceed the drive limit range. Thus, image sensor 110 is driven within the range in which the light intensity ratio larger than or equal to the allowable value is obtained, whereby light falloff at edges caused by the image stabilization can be reduced.

3. Effects, etc.

As described above, digital camera 1 (an example of the imaging apparatus) according to the present exemplary embodiment includes optical system (210, 220, 230), image sensor 110 (an example of the imaging device), aperture 260, operation unit 130 (an example of the setting unit), gyro sensor 184 (an example of the shake detector), sensor driver 181 and BIS processor 183 (an example of the image stabilization unit), flash memory 142 (an example of the storage unit), and camera controller 140 (an example of the controller). The optical system includes OIS lens 220 (an example of the correction lens). Image sensor 110 generates image data based on an image formed through the optical system. Aperture 260 adjusts an amount of light entering imaging device 110 through the optical system. Operation unit 130 receives setting of a shooting mode. Gyro sensor 184 detects a shake amount of the optical system or the imaging apparatus. Sensor driver 181 and BIS processor 183 perform an image stabilization by motion picture sensor 110 by an image stabilization amount obtained based on the shake amount. Flash memory 142 stores drive limit range table 145 (an example of the drive limit range information) indicating a drive limit range with respect to various types of aperture values, regarding the optical system. Camera controller 140 controls aperture 260, sensor driver 181, and BIS processor 183.

The drive limit range includes a range in which image sensor 110 is to be driven. The drive limit range indicates a range in which a light attenuation rate becomes less than or equal to a predetermined value. That is, the drive limit range indicates a range in which the light intensity ratio becomes larger than or equal to a predetermined value. When a set shooting mode is not a mode (for example, A mode or M mode) in which the aperture value is designated (NO in S11 and NO in S31), camera controller 140 sets the aperture value based on drive limit range table 145 (S25, S28, S44) during the image stabilization operation.

As described above, when the set shooting mode is not a mode in which the aperture value is designated (for example, when the shooting mode is the S mode or the P mode), the aperture value is set based on drive limit range table 145. With this process, image sensor 110 is driven within the range in which the light attenuation rate is low during the image stabilization operation. Therefore, light falloff at edges of the captured image can be reduced.

When the shooting mode is the mode in which the aperture value is designated (for example, when the shooting mode is the A mode or the M mode), the image stabilization amount is limited such that the range of movement (image stabilization range) of image sensor 110 when image sensor 110 is moved by the image stabilization amount falls within the drive limit range set based on the designated aperture value (S18, S38). When the aperture value is designated by the user, the drive limit range cannot be changed by changing the aperture value. Therefore, the image stabilization amount is limited to cause image sensor 110 to move within the drive limit range. Thus, light falloff at edges of the captured image can be reduced.

If the set shooting mode is not the mode in which the aperture value is designated, the aperture value may be fixed to a predetermined value. The predetermined value is an aperture value providing the drive limit range larger than or equal to the range where image sensor 110 can be driven by BIS processor 183. With this configuration, light falloff at edges of the captured image can also be reduced, because image sensor 110 moves within the drive limit range during the image stabilization.

(Other Exemplary Embodiments)

The idea of the above exemplary embodiment is not limited to the exemplary embodiment described above. There could be various other exemplary embodiments. Other exemplary embodiments to which the idea of the above exemplary embodiment is applicable will be described below.

The first exemplary embodiment describes an example where the image stabilization is performed with the BIS. Therefore, a table indicating the drive limit range for the BIS (that is, image sensor 110) is used as the drive limit range table in the above exemplary embodiment. In addition to or in place of the abovementioned table, a table indicating a drive limit range for the OIS (that is, OIS lens 220) may be used as the drive limit range table. When the image stabilization with the OIS is performed, the aperture value and the image stabilization amount can also be controlled in the same manner as in the control with the BIS by referring to the drive limit range table for the OIS.

Figure 13:
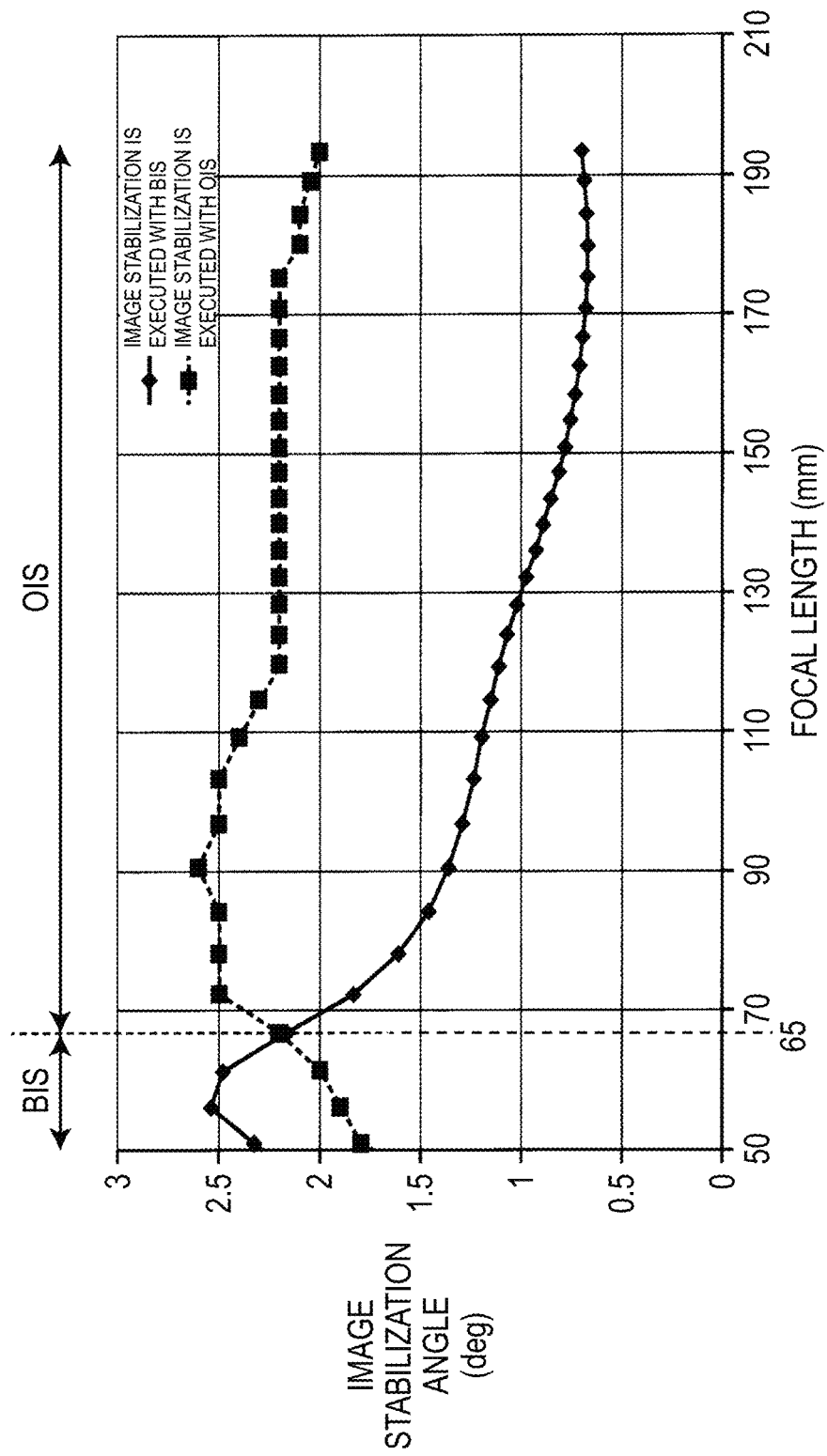
FIG. 13 is a graph showing image stabilization angles relative to focal lengths in BIS and OIS.

In addition, which one of the OIS and the BIS is preferentially activated may be switched based on a predetermined condition. FIG. 13 is a graph showing image stabilization angles with respect to focal lengths in the OIS and the BIS. In FIG. 13, the horizontal axis indicates the focal length, and the vertical axis indicates the image stabilization angle. The image stabilization angle means the camera shake maximum angle for which the image stabilization can be performed with a predetermined light intensity ratio being maintained. It is found from FIG. 13 that the image stabilization angle for the BIS is larger than that for the OIS within the range where the focal length is smaller than or equal to 65 mm, and the image stabilization angle for the OIS is larger than that for the BIS within the range where the focal length exceeds 65 mm. This indicates that, within the range where the focal length is smaller than or equal to 65 mm, the BIS can correct a larger camera shake as compared to the OIS, and within the range where the focal length exceeds 65 mm, the OIS can correct a larger camera shake as compared to the BIS. From the above, the correction unit may be switched such that the BIS is used to perform the image stabilization within the range where the focal length is smaller than or equal to 65 mm, and the OIS is used to perform the image stabilization within the range where the focal length exceeds 65 mm. In addition, the image stabilization may be performed using both the OIS and BIS within the range where the focal length is 65 mm±β. Specifically, the correction unit may be switched such that the BIS is used to perform the image stabilization within the range where the focal length is smaller than or equal to (65 mm−β), both the BIS and the OIS are used within the range where the focal length is (65 mm±β), and the OIS is used within the range where the focal length exceeds (65 mm+β).

In the first exemplary embodiment, the aperture value is dynamically controlled according to the camera shake amount during the image stabilization when the shooting mode is not the mode in which the aperture value is designated. In place of such control, the aperture value may be fixed to a predetermined value, whatever the camera shake amount is, during the image stabilization when the shooting mode is not the mode in which the aperture value is designated. For example, the aperture value may be set to the predetermined value when the power supply of digital camera 1 is turned on.

Specifically, the aperture value is set to a value achieving a drive limit range larger than or equal to the drivable range in the BIS or the OIS. For example, if the drivable range of image sensor 110 in the BIS is 21.80 mm when the image stabilization is performed with the BIS, the aperture value is set to any of the values corresponding to the AVs larger than or equal to AV 6, as indicated in FIG. 14, in drive limit range table 145 shown in FIG. 7. Thus, the drive limit range not less than 21.80 mm can be ensured, despite the focal length and the zoom position. In this case, even if the BIS or the OIS is activated with the maximum value (21.80 mm) of the drive limit range, the influence of light falloff can be reduced.

Further, the control of the aperture value during the image stabilization described with reference to the flowcharts in FIGS. 9 to 11 may be executed only when digital camera 1 is in a specific state (mode). For example, the control of the aperture value during correction of the camera shake amount described above may be executed, when it is detected that the user is shooting images with digital camera 1 while walking (so-called shooting while walking). For example, the start of shooting while walking can be detected when a camera shake amount larger than or equal to a predetermined value is continued for a certain period of time, and the end of the shooting while walking can be determined when a camera shake amount less than or equal to a predetermined value is continued for a certain period of time. During the shooting while walking, the camera shake amount is increased, and therefore, it is considered that light falloff at edges due to the image stabilization is likely to occur. In view of this, the control described above is effective.

The above exemplary embodiment describes, as the configuration for the image stabilization, the configuration where at least one of the lens and the imaging device is driven according to the camera shake amount. However, the configuration for the image stabilization is not limited thereto. That is, the configuration for the image stabilization is not essential in the image stabilization control in the present disclosure. For example, a region from which an image is cropped in an imaging region of the imaging device may be changed according to a camera shake, and with this operation, the above-mentioned control can also be applied to a configuration for electronic image stabilization for canceling a camera shake. That is, an aperture or an amount of movement of a cropping region (image stabilization amount) may be controlled such that the range of movement of the cropping region which is varied according to a camera shake falls within the drive limit range.

The gyro sensor serving as the shake detector is not limited to a sensor outputting an analog signal. It may be a sensor outputting a digital signal.

The interchangeable lens camera has been described above as an example of the imaging apparatus. However, the imaging apparatus may be of a type with an integrated lens.

The exemplary embodiments have been described herein as examples of the technique in the present disclosure. For that purpose, the detailed description and the accompanying drawings have been provided. Therefore, components in the accompanying drawings and the detailed description may include components that are not essential for solving problems. Accordingly, such inessential components should not be readily construed as being essential based on the fact that such inessential components are included in the detailed description and the accompanying drawings.

The above exemplary embodiments are provided to illustrate the technique in the present disclosure. Therefore, various changes, replacements, additions, omissions, and the like may be applied to the above exemplary embodiments within the scope of the claims or equivalents thereof.

The example where camera controller 140 controls gyro sensor 184, sensor driver 181, and BIS processor 183 has been described in the present exemplary embodiment. Gyro sensor 224, OIS driver 221, and OIS processor 223 may also similarly be controlled by camera controller 140, or may be controlled by lens controller 240.

(Present Disclosure)

The following configurations are described in the above exemplary embodiments.

(1) The exemplary embodiment provides digital camera 1 (an example of the imaging apparatus in the present disclosure) including camera body 100 to which interchangeable lens 200 (an example of the optical system in the present disclosure) including OIS lens 220 (an example of the correction lens in the present disclosure) and aperture 260 is mountable.

Digital camera 1 includes: image sensor 110 (an example of the imaging device in the present disclosure) that generates image data based on an image formed through interchangeable lens 200; operation unit 130 (an example of the setting unit in the present disclosure) that receives setting of a shooting mode; gyro sensors 184 and 224 (an example of the shake detector in the present disclosure) that detect a shake amount of at least one of interchangeable lens 200 and camera body 100; sensor driver 181 and BIS processor 183, or OIS driver 221 and OIS processor 223 (an example of the image stabilization unit in the present disclosure) that perform an image stabilization by moving at least one of OIS lens 220 and image sensor 110 by an image stabilization amount obtained based on the shake amount; flash memory 142 (an example of the storage unit in the present disclosure) that stores drive limit range table 145 (an example of the drive limit range information in the present disclosure) that indicates a relationship between an aperture value and a drive limit range corresponding to interchangeable lens 200; and camera controller 140 or lens controller 240 (an example of the controller in the present disclosure) that controls the aperture and the image stabilization unit.

The drive limit range includes a range where at least one of OIS lens 220 and image sensor 110 is to be moved by camera controller 140 or lens controller 240. The drive limit range also indicates a range where a light attenuation rate is less than or equal to a predetermined value.

When the shooting mode set via operation unit 130 is not the A mode or the M mode (an example of the first mode in the present disclosure) that allows designation of the aperture value (NO in S11 or NO in S31), camera controller 140 or lens controller 240 sets the aperture value based on drive limit range table 145 and causes sensor driver 181 and BIS processor 183, or OIS driver 221 and OIS processor 223 to perform the image stabilization.

(2) In (1), when the shooting mode is the A mode or the M mode, camera controller 140 or lens controller 240 may limit the image stabilization amount to allow the range where at least one of OIS lens 220 and image sensor 110 is to be moved to fall within the drive limit range set based on the designated aperture value (S18, S38).

(3) In (1), camera controller 140 or lens controller 240 may set the aperture value based on the shake amount to allow the range where at least one of OIS lens 220 and image sensor 110 is to be moved to fall within the drive limit range (S25, S28, S44).

(4) In (1), when the shooting mode set via operation unit 130 is not the first mode (A mode or M mode), camera controller 140 or lens controller 240 may fix the aperture value to a predetermined value. The predetermined value may be a value for allowing the drive limit range to include a range where at least one of OIS lens 220 and image sensor 110 is drivable by sensor driver 181 and BIS processor 183 or by OIS driver 221 and OIS processor 223.

(5) In (1), the drive limit range information (145) may be information indicating a relationship between the aperture value and the drive limit range, corresponding to a zoom position and a focal length of interchangeable lens 200.

(6) In (1), camera controller 140 or lens controller 240 may cause gyro sensors 184 and 224 to detect the shake amount during a live view operation that is performed before a start of still image capturing (S40), and may set the aperture value used upon the image stabilization based on the shake amount detected during the live view operation by referring to the drive limit range information, after receiving an instruction to start the still image capturing.

(7) In (1), the controller may cause gyro sensors 184 and 224 to detect the shake amount during capturing of a motion picture (S20), set the aperture value used upon the image stabilization based on the detected shake amount and drive limit range table 145 (S25, S28), and control sensitivity of image sensor 110 (S26, S29).

(8) In (1), the image stabilization unit may include at least a first correction unit (sensor driver 181 and BIS processor 183) that drives image sensor 110 in a plane perpendicular to an optical axis according to the shake amount or a second correction unit (OIS driver 221 and OIS processor 223) that drives OIS lens 220 in the plane perpendicular to the optical axis according to the shake amount.

(9) In (1), the image stabilization unit may include a first correction unit (sensor driver 181 and BIS processor 183) that drives image sensor 110 in a plane perpendicular to an optical axis according to the shake amount and a second correction unit (OIS driver 221 and OIS processor 223) that drives OIS lens 220 in the plane perpendicular to the optical axis according to the shake amount. Camera controller 140 or lens controller 240 may select and activate at least one of the first correction unit and the second correction unit according to a focal length of interchangeable lens 200, when performing the image stabilization.

(10) In (9), while performing the image stabilization, camera controller 140 or lens controller 240 may select and activate the first correction unit (sensor driver 181 and BIS processor 183) when the focal length of interchangeable lens 200 is shorter than a reference value, and may select and activate the second correction unit (OIS driver 221 and OIS processor 223) when the focal length is longer than the reference value.

(11) In (1), the mode that allows designation of the aperture value may be at least an aperture priority mode or a manual mode.

(12) Digital camera 1 (an example of the imaging apparatus in the present disclosure) may have an image stabilization function. Digital camera 1 includes: an optical system (210, 220, and 230) including OIS lens 220 (an example of the correction lens in the present disclosure); image sensor 110 (an example of the imaging device in the present disclosure) that generates image data based on an image formed through the optical system; aperture 260 that adjusts an amount of light entering image sensor 110 through the optical system; operation unit 130 (an example of the setting unit in the present disclosure) that receives setting of a shooting mode; gyro sensors 184 and 224 (an example of the shake detector in the present disclosure) that detect a shake amount of at least one of the optical system and digital camera 1; an image stabilization unit (sensor driver 181 and BIS processor 183, or OIS driver 221 and OIS processor 223) that performs an image stabilization by moving at least one of OIS lens 220 and image sensor 110 by an image stabilization amount obtained based on the shake amount; flash memory 142 (an example of the storage unit in the present disclosure) that stores drive limit range table 145 (an example of the drive limit range information in the present disclosure) that indicates a relationship between an aperture value and a drive limit range corresponding to the optical system; and camera controller 140 or lens controller 240 (an example of the controller in the present disclosure) that controls the aperture and the image stabilization unit.

The drive limit range includes a range where at least one of OIS lens 220 and image sensor 110 is to be moved by camera controller 140 or lens controller 240. The drive limit range indicates a range where a light attenuation rate is less than or equal to a predetermined value.

When the shooting mode set via operation unit 130 is not the A mode or the M mode (an example of the first mode in the present disclosure) that allows designation of the aperture value (NO in S11, NO in S31), camera controller 140 or lens controller 240 sets the aperture value based on drive limit range table 145 (S25, S28, S44) and causes the image stabilization unit to perform the image stabilization.

The idea of the present disclosure is applicable to electronic apparatuses (imaging apparatuses such as digital cameras and digital videos, cellular phones, smartphones, and the like) having an imaging function equipped with an image stabilization function.

What is claimed is:

1. An imaging apparatus including a camera body to which an interchangeable lens including a correction lens and an aperture is mountable, the imaging apparatus comprising:
    an imaging device that generates image data based on an image formed through the interchangeable lens;
    a setting unit that receives setting of a shooting mode;
    a shake detector that detects a shake amount of at least one of the interchangeable lens and the camera body;
    an image stabilization unit that performs an image stabilization by moving at least one of the correction lens and the imaging device by an image stabilization amount obtained based on the shake amount;
    a storage unit that stores drive limit range information that indicates a relationship between an aperture value and a drive limit range corresponding to the interchangeable lens; and
    a controller that controls the aperture and the image stabilization unit, wherein
    the drive limit range includes a range where the at least one of the correction lens and the imaging device is to be moved by the controller, the drive limit range indicating a range where a light attenuation rate is less than or equal to a predetermined value, and
    the controller sets the aperture value based on the drive limit range information and causes the image stabilization unit to perform the image stabilization, when the shooting mode set via the setting unit is not a first mode that allows designation of the aperture value.

2. The imaging apparatus according to claim 1, wherein the controller limits the image stabilization amount to allow the range where the at least one of the correction lens and the imaging device is to be moved to fall within the drive limit range set based on the aperture value that has been designated, when the shooting mode is the first mode.

3. The imaging apparatus according to claim 1, wherein the controller sets the aperture value based on the shake amount to allow the range where the at least one of the correction lens and the imaging device is to be moved to fall within the drive limit range.

4. The imaging apparatus according to claim 1, wherein
    the controller fixes the aperture value to a predetermined value, when the shooting mode set via the setting unit is not the first mode,
    the predetermined value being a value for allowing the drive limit range to include a range where the at least one of the correction lens and the imaging device is drivable by the image stabilization unit.

5. The imaging apparatus according to claim 1, wherein the drive limit range information is information indicating a relationship between the aperture value and the drive limit range, corresponding to a zoom position and a focal length of the interchangeable lens.

6. The imaging apparatus according to claim 1, wherein the controller:
    causes the shake detector to detect the shake amount during a live view operation that is performed before a start of still image capturing; and
    sets the aperture value used upon the image stabilization based on the shake amount detected during the live view operation by referring to the drive limit range information, after receiving an instruction to start the still image capturing.

7. The imaging apparatus according to claim 1, wherein the controller causes the shake detector to detect the shake amount during capturing of a motion picture, sets the aperture value used upon the image stabilization based on the detected shake amount and the drive limit range information, and controls sensitivity of the imaging device.

8. The imaging apparatus according to claim 1, wherein the image stabilization unit includes at least a first image stabilization unit that drives the imaging device in a plane perpendicular to an optical axis according to the shake amount or a second image stabilization unit that drives the correction lens in the plane perpendicular to the optical axis according to the shake amount.

9. The imaging apparatus according to claim 1, wherein
    the image stabilization unit includes a first image stabilization unit that drives the imaging device in a plane perpendicular to an optical axis according to the shake amount, and a second image stabilization unit that drives the correction lens in the plane perpendicular to the optical axis according to the shake amount, and
    the controller selects and activates at least one of the first image stabilization unit and the second image stabilization unit according to a focal length of the interchangeable lens, when performing the image stabilization.

10. The imaging apparatus according to claim 9, wherein, during the image stabilization, the controller selects and activates the first image stabilization unit when the focal length of the interchangeable lens is shorter than a reference value, and selects and activates the second image stabilization unit when the focal length of the interchangeable lens is longer than the reference value.

11. The imaging apparatus according to claim 1, wherein the first mode is at least an aperture priority mode or a manual mode.

12. An imaging apparatus having an image stabilization function, the imaging apparatus comprising:
    an optical system including a correction lens;
    an imaging device that generates image data based on an image formed through the optical system;
    an aperture that adjusts an amount of light entering the imaging device through the optical system;
    a setting unit that receives setting of a shooting mode;
    a shake detector that detects a shake amount of at least one of the optical system and the imaging apparatus;
    an image stabilization unit that performs an image stabilization by moving at least one of the correction lens and the imaging device by a shake stabilization amount obtained based on the shake amount;
    a storage unit that stores drive limit range information that indicates a relationship between an aperture value and a drive limit range corresponding to the optical system; and a controller that controls the aperture and the image stabilization unit, wherein the drive limit range includes a range where the at least one of the correction lens and the imaging device is to be moved by the controller, the drive limit range indicating a range where a light attenuation rate is less than or equal to a predetermined value, and the controller sets the aperture value based on the drive limit range information and causes the image stabilization unit to perform the image stabilization, when the shooting mode set via the setting unit is not a first mode that allows designation of the aperture value.

* * * * *